(12) United States Patent
Hu et al.

(10) Patent No.: US 10,416,440 B2
(45) Date of Patent: Sep. 17, 2019

(54) PROJECTION SYSTEM, LIGHT SOURCE SYSTEM AND LIGHT SOURCE ASSEMBLY

(71) Applicant: APPOTRONICS CORPORATION LIMITED, Shenzhen (CN)

(72) Inventors: Fei Hu, Shenzhen (CN); Yi Li, Pleasanton, CA (US)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/580,623

(22) PCT Filed: Jun. 6, 2016

(86) PCT No.: PCT/CN2016/084929
§ 371 (c)(1),
(2) Date: Dec. 7, 2017

(87) PCT Pub. No.: WO2016/197888
PCT Pub. Date: Dec. 15, 2016

(65) Prior Publication Data
US 2018/0172978 A1    Jun. 21, 2018

(30) Foreign Application Priority Data

Jun. 8, 2015   (CN) ............... 2015 2 0388324 U

(51) Int. Cl.
| | |
|---|---|
| *G02B 26/00* | (2006.01) |
| *G03B 21/20* | (2006.01) |
| *G02B 26/02* | (2006.01) |
| *G03B 33/08* | (2006.01) |

(52) U.S. Cl.
CPC ......... *G02B 26/008* (2013.01); *G02B 26/00* (2013.01); *G02B 26/023* (2013.01); *G03B 21/20* (2013.01); *G03B 21/204* (2013.01); *G03B 21/2006* (2013.01); *G03B 33/08* (2013.01)

(58) Field of Classification Search
CPC .. G03B 21/204; G03B 21/206; G03B 21/208; G03B 21/2013; G03B 21/2033;
(Continued)

(56) References Cited

U.S. PATENT DOCUMENTS

2010/0328628 A1* 12/2010 Masuda ............... G02B 26/008
                                                     353/85
2011/0310353 A1* 12/2011 Maeda ............... G03B 21/2033
                                                     353/31
(Continued)

FOREIGN PATENT DOCUMENTS

| CN | 102566230 A | 7/2012 |
|---|---|---|
| CN | 102722014 A | 10/2012 |

(Continued)

OTHER PUBLICATIONS

International Search Report in the parent PCT application No. PCT/CN2016/084929, dated Sep. 1, 2016.
(Continued)

*Primary Examiner* — Sultan Chowdhury
(74) *Attorney, Agent, or Firm* — Chen Yoshimura LLP

(57) ABSTRACT

A projection system, a light source system and a light source assembly. The light source system includes an excitation light source, a wavelength conversion device, a filter device, a drive device and a first optical assembly. The wavelength conversion device includes at least one wavelength conversion region; the filter device is fixed relative to the wavelength conversion device and includes at least one first filter region. The drive device drives the wavelength conversion device and the filter device, so that the wavelength conversion region and the first filter region synchronously move, and the wavelength conversion region is periodically disposed on a propagation path of excitation light, to wavelength-convert the excitation light into the converted light. The first optical assembly guides the converted light into the
(Continued)

first filter region; and the first filter region filters the converted light to improve its color purity.

18 Claims, 19 Drawing Sheets

(58) Field of Classification Search
CPC .......................... G03B 21/2066; H04N 9/3111; H04N 9/3114; H04N 9/3155; H04N 9/3158; H04N 9/3161; H04N 9/3164
See application file for complete search history.

(56) References Cited

U.S. PATENT DOCUMENTS

| | | |
|---|---|---|
| 2013/0229634 A1 | 9/2013 | Hu et al. |
| 2013/0250546 A1 | 9/2013 | Hu et al. |
| 2013/0258639 A1 | 10/2013 | Hu et al. |

FOREIGN PATENT DOCUMENTS

| | | |
|---|---|---|
| CN | 104238249 A | 12/2014 |
| CN | 204759006 U | 11/2015 |
| EP | 2793078 A | 10/2014 |

OTHER PUBLICATIONS

IPRP in the parent PCT application No. PCT/CN2016/084929, dated Dec. 12, 2017.
Japanese Office Action, dated Sep. 18, 2018 in a counterpart Japanese patent application, No. JP 2017-563510.
Japanese Office Action, dated Apr. 9, 2019 in a counterpart Japanese patent application, No. JP 2017-563510.
Extended European Search Report, dated Nov. 16, 2018 in corresponding application EP 16806786.6.

* cited by examiner

PROJECTION SYSTEM, LIGHT SOURCE SYSTEM AND LIGHT SOURCE ASSEMBLY

BACKGROUND OF THE INVENTION

Field of the Invention

This invention relates to the technology field of light sources for illumination and display, and in particular, it relates to a projection system, a light source system and a light source assembly.

Description of Related Art

Projectors are widely used for movie playing, conferences, advertisement, and other applications. It is well known that light sources for projectors commonly uses a phosphor color wheel to generate a color light sequence. The different color segments of the phosphor color wheel are sequentially and periodically disposed on the propagation path of an excitation light; the excitation light excites the phosphor materials on different segments of the phosphor color wheel, to generate different color fluorescent lights (converted lights). However, because the spectral ranges of the color lights generated by the phosphor materials are relatively broad, some of the fluorescent lights have insufficient color purity. As a result, the color gamut of the light source is not sufficiently large. In such situations, filters are typically used to filter the fluorescent lights to improve the color purity of the lights. However, because the spectra of the fluorescent lights of different colors have partial overlap, it is difficult to use one filter plate to filter such lights. Thus, different filter plates corresponding to different colors of fluorescent lights need to be provided. In a solution provided by one conventional technology, a filter wheel is provided at the entrance of a light homogenizing rod; the filter wheel is driven to move synchronously with the phosphor color wheel by controlling the drive devices of the phosphor color wheel and the filter plate color wheel, using a control electrical circuit. Such devices have problems such as complex structures, difficult to realize, and poorly synchronized movements.

SUMMARY

With the increased competition in the projection field, manufacturers focus on improving product quality to maintain competitiveness. In the process of seeking quality improvements of projector products, the inventors of this invention discovered that in the conventional light sources for projectors, the synchronized moving structures of the phosphor color wheel and filter wheel have problems such as complex structures, difficult to realize, and poorly synchronized movements.

Thus, there is a need for projector systems, light source systems and light source assemblies that can solve the above-described problems of conventional light source for projectors that use synchronized moving structures for the phosphor color wheel and filter wheel.

Embodiments of the present invention provide a projector system, a light source system and a light source assembly which simplify the synchronized moving structures for the wavelength conversion device and the filter device, and improves the synchronization effect.

To solve the above described technical problems, in one aspect, the present invention provides:

A light source system including:

an excitation light source for generating an excitation light;

a wavelength conversion device including at least one wavelength conversion region;

a filter device fixed relative to the wavelength conversion device and including at least one first filter region;

a drive device for driving the wavelength conversion device and the filter device, wherein the wavelength conversion region and the first filter region move synchronously, and wherein the wavelength conversion region is periodically disposed on a propagation path of excitation light and wavelength-converts the excitation light into a converted light; and a first optical assembly for guiding the converted light onto the first filter region, wherein the first filter region filters the converted light to increase its color purity;

wherein the wavelength conversion device and the filter device are two ring shaped structures that are coaxially fixed to each other; and wherein the first optical assembly is disposed so that a light spot formed on the wavelength conversion device by the excitation light and a light spot formed on the filter device by the converted light are disposed at a predefined angle from each other with respect to a center of the two ring shaped structures, the predefined angle being greater than 0 degree and less than 180 degrees.

The drive device is a rotation device having a rotational axis, and wherein the two ring shaped structures are coaxially fixed on the rotational axis.

The wavelength conversion device and the filter device are spaced apart from each other in an axial direction, wherein the first optical assembly includes at least one light collecting device disposed on an optical path between the wavelength conversion device and the filter device to collect the converted light, wherein an energy of the converted light incident on the filter device with incident angles less than or equal to 60 degrees is more than 90% of a total energy of the converted light.

The wavelength conversion region reflects the converted light, and wherein an exit direction of the converted light from the wavelength conversion region is opposite to an incident direction of the excitation light on the wavelength conversion region.

The wavelength conversion region transmits the converted light, and wherein an exit direction of the converted light from the wavelength conversion region is the same as an incident direction of the excitation light on the wavelength conversion region.

The first optical assembly includes at least one light collecting device for collecting the converted light, wherein an energy of the converted light incident on the filter device with incident angles less than or equal to 60 degrees is more than 90% of a total energy of the converted light.

The first optical assembly includes at least one reflecting device for reflecting the converted light and changing a propagation direction of the converted light, wherein the reflecting device is a planar reflecting device or a hemi-ellipsoidal or hemispherical reflecting device having an inward facing reflecting surface.

The planar reflecting device includes a dichroic mirror or a reflective mirror.

The hemi-ellipsoidal or hemispherical reflecting device having the inward facing reflecting surface includes a light entrance aperture, and wherein the excitation light is incident on the wavelength conversion device through the light entrance aperture.

The wavelength conversion device includes a first light transmission region, wherein the first light transmission region is periodically disposed on the propagation path of the excitation light when driven by the drive device, and wherein the first light transmission region transmits the excitation light.

The light source system further includes a second optical assembly, wherein the second optical assembly combines the excitation light that has transmitted through the first light transmission region and the converted light that has been filtered by the first filter region into one beam.

The filter device further includes a second light transmission region or a second filter region, and wherein the first optical assembly guides the excitation light, which has transmitted through the first light transmission region, along a same propagation path as the converted light to the second light transmission region or a second filter region to be transmitted or filtered.

The light source system further includes an illumination light source for generating an illumination light, wherein the wavelength conversion device further includes a first light transmission region, the first light transmission region being periodically disposed on a propagation path of the illumination light when driven by the drive device, wherein the first light transmission region transmitting the illumination light, wherein the filter device further includes a second light transmission region or a second filter region, and wherein the first optical assembly guides the illumination light, which has transmitted through the first light transmission region, along a same propagation path as the converted light to the second light transmission region or the second filter region to be transmitted or filtered.

The light source system further includes an illumination light source and a second optical assembly, the illumination source generating an illumination light, wherein the second optical assembly combines the illumination light and the converted light that has been filtered by the first filter region into one beam.

The wavelength conversion device has a cylindrical shaped structure, wherein the filter device has a ring shaped structure and is coaxially fixed with the cylindrical shaped structure, wherein the ring shaped structure and the cylindrical shaped structure are driven by the drive device to rotate coaxially and synchronously.

The wavelength conversion region is located on an outer side surface of the cylindrical shaped structure and reflects the converted light, and wherein the first filter region is located to an outside of the cylindrical shaped structure to receive the converted light.

The wavelength conversion device and the filter device are two coaxially fixed and nested cylindrical shaped structures which are driven by the drive device to rotate coaxially and synchronously, wherein the wavelength conversion region and the first filter region are respectively located on side surfaces of the two cylindrical shaped structures, and wherein the converted light transmits through the wavelength conversion region to be incident on the first filter region.

To solve the above technical problems, the present invention also provides a light source assembly, including:

a wavelength conversion device including at least one wavelength conversion region; and a filter device fixed relative to the wavelength conversion device and including at least one filter region, wherein the wavelength conversion region and the filter region move synchronously when driven by a drive device.

The wavelength conversion device and the filter device are two ring shaped structures coaxially fixed to each other.

The wavelength conversion device is a cylindrical shaped structure, and wherein the filter device is a ring shaped structure which is coaxially fixed to the cylindrical shaped structure.

The wavelength conversion region is located on an outer side surface of the cylindrical shaped structure, and wherein the filter region is located on the ring shaped structure and is located to an outside of the cylindrical shaped structure.

The wavelength conversion device and the filter device are two coaxially fixed and nested cylindrical shaped structures, and wherein the wavelength conversion region and the filter region are respectively located on side surfaces of the two cylindrical shaped structures.

The wavelength conversion device and the filter device are two strip shaped structures connected together end to end, and the wavelength conversion region and the filter region are sequentially disposed adjacent to each other on the two strip shaped structures.

To solve the above technical problems, the present invention also provides a projection system comprising the light source system described above.

Advantages of the present invention include: Compared to conventional technologies, the projection system, light source system and light source system assembly of the present invention, the wavelength conversion device and the filter device are fixed with respect to each other, and are driven by the same drive mechanism. They have the advantages of simple structures, ease of implementation, and superior synchronization.

DETAILED DESCRIPTION OF PREFERRED EMBODIMENTS

Figure 1:
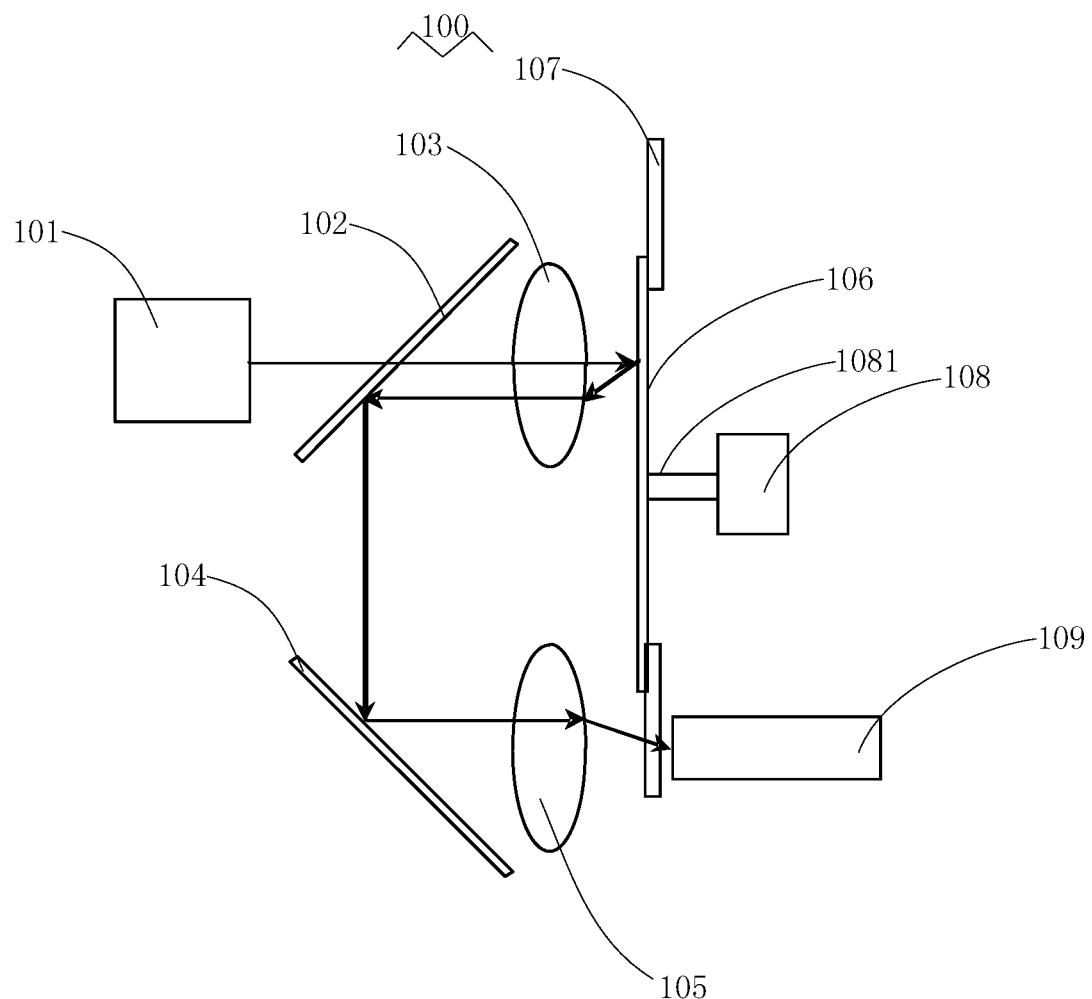
FIG. 1 shows the structure of a light source system according to a first embodiment of the present invention.
Figure 2:
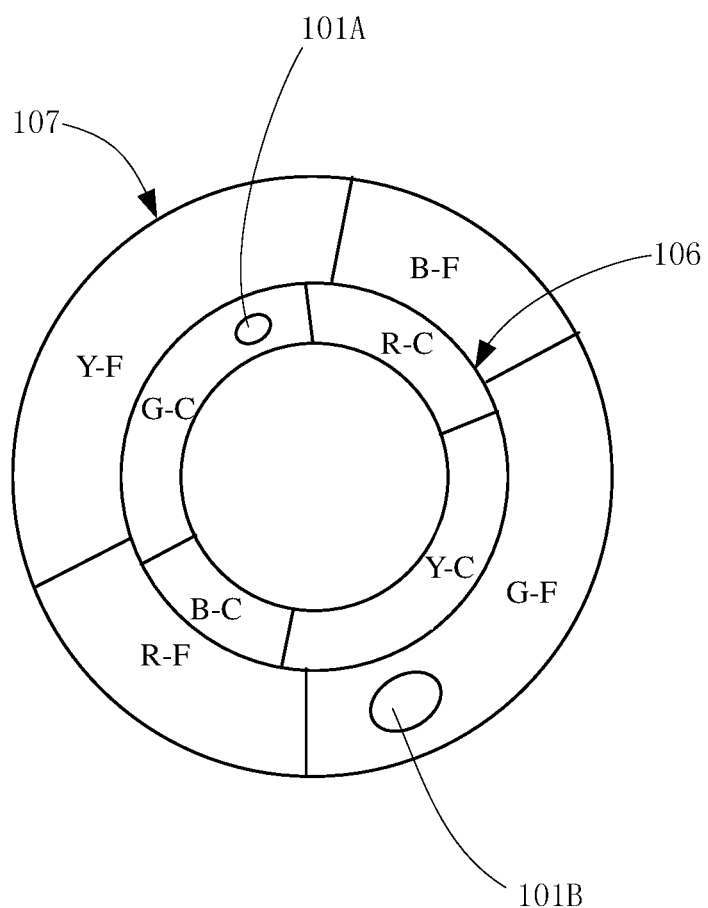
FIG. 2 is a plan view of the wavelength conversion device and the filter device of the light source system of FIG. 1.

Refer to FIGS. 1 and 2, where FIG. 1 shows the structure of a light source system according to a first embodiment of the present invention and FIG. 2 is a plan view of the wavelength conversion device and the filter device of the light source system of FIG. 1. As shown in FIG. 1, the light source system 100 of this embodiment primarily includes an excitation light source 101, a dichroic mirror 102, a reflector 104, lenses 103 and 105, a wavelength conversion device 106, a filter device 107, a drive device 108 and a light homogenizing device 109.

The excitation light source 101 generates an excitation light. In this embodiment, the excitation light source 101 is a UV or near-UV laser or a UV or near-UV light emitting diode (LED), for generating a UV or near-UV excitation light.

As shown in FIG. 2, the wavelength conversion device 106 has a ring shaped structure, and includes at least one wavelength conversion region. In this embodiment, the wavelength conversion device 106 includes a red wavelength conversion region, a green wavelength conversion region, a blue wavelength conversion region, and a yellow wavelength conversion region, which are individual regions arranged in a circumferential direction around the ring shaped structure. These wavelength conversion regions are provided different wavelength conversion materials (such as phosphor materials or nanostructure materials). These wavelength conversion materials respectively convert the UV or near-UV excitation light incident on them, by wavelength conversion, into converted lights of the corresponding colors. More specifically, the red wavelength conversion region converts the UV or near-UV excitation light incident on it into a red converted light, the green wavelength conversion region converts the UV or near-UV excitation light incident on it into a green converted light, the blue wavelength conversion region converts the UV or near-UV excitation light incident on it into a blue converted light, and the yellow wavelength conversion region converts the UV or near-UV excitation light incident on it into a yellow converted light. In this embodiment, a reflective substrate is provided under the wavelength conversion materials, to reflect the converted light generated by the wavelength conversion materials, so that the exit direction of the converted lights from the wavelength conversion regions is the opposite of the incident direction of the excitation light onto the wavelength conversion regions.

As shown in FIG. 2, the filter device 107 has a ring shaped structure, and is coaxially fixed with the wavelength conversion device 106 and disposed on the outside of the ring of the wavelength conversion device 106. In other embodiments, the filter device 107 may be disposed on the inside of the ring of the wavelength conversion device 106. The filter device 107 includes at least one filter region. In this embodiment, the filter device 107 includes a red filter region, a green filter region, a blue filter region, and a yellow filter region, which are individual regions arranged in a circumferential direction around the ring shaped structure. The above filter regions spatially correspond to the wavelength conversion regions of the respective colors on the wavelength conversion device 106.

Each wavelength conversion region and the filter region of the same color are disposed at 0 to 360 degrees from each other with respect to the center of the rings of the wavelength conversion device 106 and filter device 107, such as 0 to 180 degrees, including or excluding the endpoints, or 180 to 360 degrees, including or excluding the endpoints.

As shown in FIG. 2, each wavelength conversion region and the filter region of the same color are disposed at 180 degrees from each other with respect to the center of the rings of the wavelength conversion device 106 and filter device 107. The filter regions have different filtering spectral ranges, and filter the converted light of the corresponding color to improve the color purity of the converted lights.

Of course, the wavelength conversion region and the filter region of the same color may be disposed at any angle between 0 and 360 degrees from each other with respect to the center of the rings of the wavelength conversion device 106 and filter device 107, and the invention is not limited to any particular angle.

As shown in FIG. 1, the drive device 108 is a rotation device having a rotation axis 1081, such as a rotation motor. The wavelength conversion device 106 and the filter device 107 are coaxially fixed to the rotation axis 1081, and are driven by the rotation axis 1081 to rotate synchronously.

In the operation of the light source system 100 of FIG. 1, the UV or near-UV excitation light generated by the excitation light source 101 is transmitted through the dichroic mirror 102, and focused by the lens 103 onto the wavelength conversion device 106, to form a light spot 101A on the wavelength conversion device 106 as shown in FIG. 2. The wavelength conversion device 106 and the filter device 107 are driven by the drive device 108 to rotate synchronously, so that the multiple wavelength conversion regions of the wavelength conversion device 106 and the multiple filter regions of the filter device 107 rotate synchronously. When the wavelength conversion device 106 and the filter device 107 rotate, the multiple wavelength conversion regions of the wavelength conversion device 106 are sequentially and periodically disposed on the propagation path of the UV or near-UV excitation light generated by the excitation light source 101, so that the UV or near-UV excitation light is sequentially converted to converted lights of different colors by the wavelength conversion regions. The different color converted lights are reflected by the wavelength conversion regions, and are guided by a first optical assembly formed by the lenses 103 and 105, the dichroic mirror 102, and the reflector 104, to be incident on the filter device 107 to form a light spot 101B as shown in FIG. 2.

In the first optical assembly, the lenses 103 and 105 are respectively used to collect and focus the converted light, to reduce the divergence angle of the converted light. The dichroic mirror 102 and reflector 104 are used to reflect the converted light to change its propagation direction. In this embodiment, the dichroic mirror 102 and the reflector 104 are disposed at 90 degrees relative to each other, and are each disposed at 45 degrees relative to the incident direction of the converted light.

In this embodiment, referring to FIG. 2, after reflection by the dichroic mirror 102 and the reflector 104, the propagation direction of the converted light is lineally translated by a predetermined distance and also turned 180 degrees; the light spot 101A and the light spot 101B are disposed at 180 degrees from each other with respect to the center of the rings of the wavelength conversion device 106 and filter device 107.

Because the wavelength conversion device 106 and the filter device 107 are fixed relative to each other, and because the wavelength conversion regions and filter regions of the same colors are disposed at 180 degrees from each other with respect to the center of the rings of the wavelength conversion device 106 and filter device 107 and rotate synchronously, it is ensured that the converted lights of different colors generated by the various wavelength conversion regions of the wavelength conversion device 106 are incident on the filter regions of the same colors of the filter device 107 after being reflected by the dichroic mirror 102 and the reflector 104. Thus, the filter regions of the same colors respectively filter the converted lights of the various colors to improve their color purity. The converted lights, after filtering by the filter regions of the filter device 107, are inputted to the light homogenizing device 109 to be homogenized. In the light source system 100 of this embodiment, the wavelength conversion device 106 and filter device 107 are fixed relative to each other and are driven by the same drive device to rotate synchronously; meanwhile, the first optical assembly is used to synchronize the wavelength conversion regions and the filter regions of the same colors. This structure has the advantages of a simple structure, easy to implement, and superior synchronization. Further, the various components of the first optical assembly are stationary relative to the excitation light source, so that they do not have to rotate with the wavelength conversion device 106 and filter device 107, which improves its optical stability.

Further, because the converted light generated by wavelength conversion typically has a near Lambertian distribution, if the converted light is directly incident on the filter region, then its incident angle can range from 0 to 90 degrees. However, because the transmission rate of the filter region can shift with increased incident angle, the first optical assembly of this embodiment further includes a focusing device (such as lens 105) to focus the converted light, so that the incident angles of the converted light onto the filter regions are relatively small, which improves the filtering effect. In preferred embodiment, by adjusting the first optical assembly, it can be achieved that the energy of the converted light incident on the filter device 107 with incident angles less than or equal to 60 degrees is more than 90% of the total energy of the converted light. In this embodiment, the dichroic mirror 102 and the reflector 104 may be replaced by other types of planar reflecting devices, and the lenses 103 and 105 may be replaced by other types of optical components. For example, the lens 105 may be replaced by other types of light condenser device such as a hollow or solid cone shaped light guide rod, lens or lens group, hollow or solid composite concentrator, curved reflecting mirror, etc.

Further, in this embodiment, the wavelength conversion regions of the wavelength conversion device 106 may be any combination of one or more of a red wavelength conversion region, a green wavelength conversion region, a blue wavelength conversion region, and a yellow wavelength conversion region. Moreover, other suitable light sources may be used as the excitation light source. Or, those skilled in the art may use wavelength conversion regions of other colors and excitation light source of other colors based on need. In such cases, the filter regions of the filter device 107 may be selected based on the colors of the converted light generated by the wavelength conversion regions of the wavelength conversion device 106. The invention is not limited to particular color selections.

Figure 3:
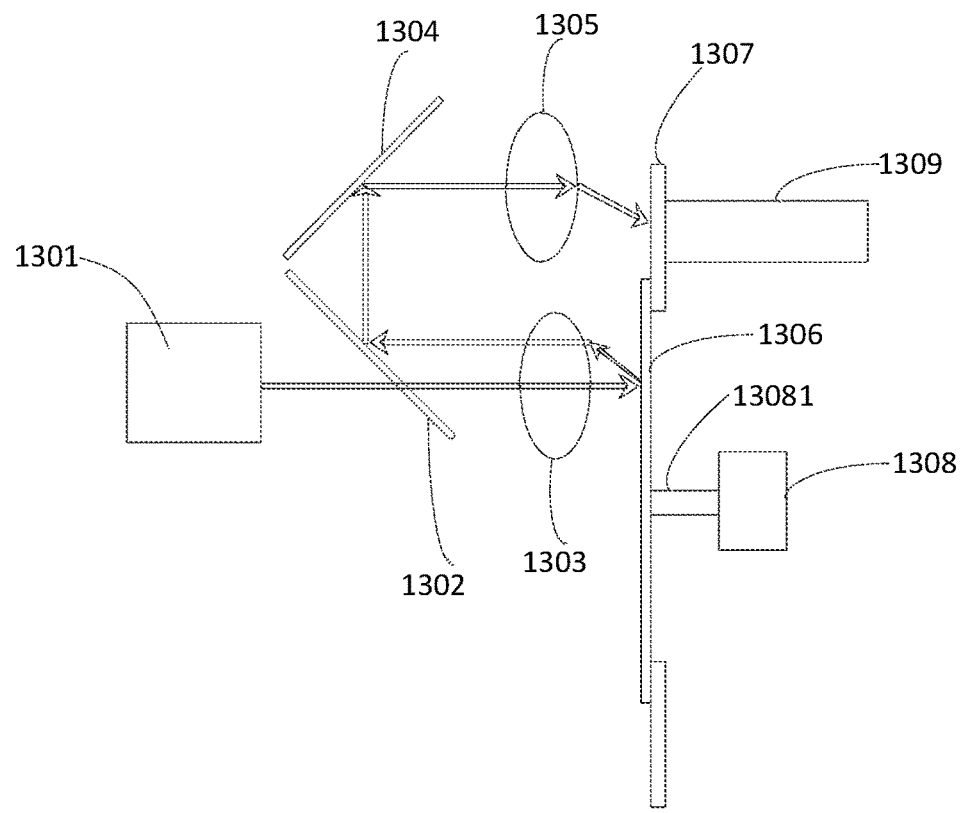
FIG. 3 shows the structure of a light source system according to another embodiment of the present invention.
Figure 4:
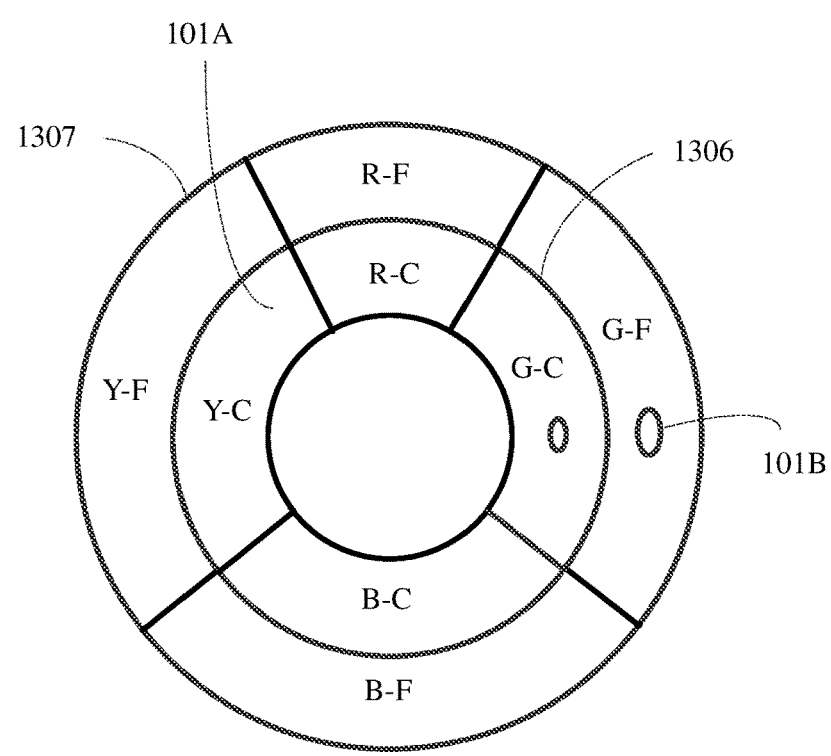
FIG. 4 is a plan view of the wavelength conversion device and the filter device of the light source system of FIG. 3.

Refer to FIGS. 3 and 4, where FIG. 3 shows the structure of a light source system according to another embodiment of the present invention, and FIG. 4 is a plan view of the wavelength conversion device and the filter device of the light source system of FIG. 3. As shown in FIG. 3, the light source system of this embodiment primarily includes an excitation light source 1301, a dichroic mirror 1302, a reflector 1304, lenses 1303 and 1305, a wavelength conversion device 1306, a filter device 1307, a drive device 1308 and a light homogenizing device 1309. Differences between this embodiment and the above first embodiment include: in this embodiment, each wavelength conversion region and the filter region of the same color are disposed at 0 degrees from each other with respect to the center of the rings of the wavelength conversion device 106 and filter device 107, as shown in FIG. 4.

In this embodiment, when each wavelength conversion region and the filter region of the same color are disposed at α degrees from each other with respect to the center of the rings of the wavelength conversion device 106 and filter device 107, as compared to the situation in FIG. 4 where each wavelength conversion region and the filter region of the same color are disposed at 0 degrees from each other with respect to the center of the rings of the wavelength conversion device 106 and filter device 107, an adjustment needs to be made to the first optical assembly of the light source system shown in FIG. 3. More specifically, while the relative positions of the various optical components of the first optical assembly remain unchanged, the first optical assembly of FIG. 3 is rotated as a whole by α degrees around the optical axis of the excitation light which is emitted from the excitation light source to the wavelength conversion device 1306. The other components are unchanged.

When each wavelength conversion region and the filter region of the same color are disposed at 180 degrees from each other with respect to the center of the rings of the wavelength conversion device 106 and filter device 107, then by making the above adjustment, i.e. keeping the relative positions of the various optical components of the first optical assembly unchanged and rotating the first optical assembly of FIG. 3 as a whole by 180 degrees around the optical axis of the excitation light which is emitted from the excitation light source to the wavelength conversion device, then the light source system becomes that shown in FIG. 1.

Figure 5:
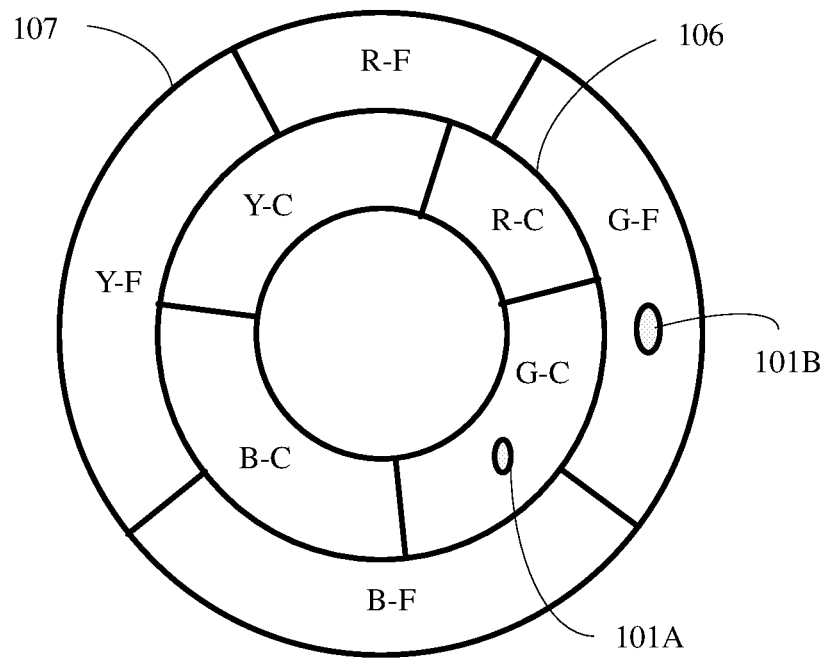
FIGS. 5-8 are plan views of the wavelength conversion device and the filter device of the light source systems according to various embodiments of the present invention.

In the configuration shown in FIG. 5, each wavelength conversion region and the filter region of the same color are disposed at 45 degrees from each other with respect to the center of the rings of the wavelength conversion device 106 and filter device 107. In this case, the first optical assembly of FIG. 3 is rotated as a whole by 45 degrees around the optical axis of the excitation light which is emitted from the excitation light source to the wavelength conversion device.

Figure 6:
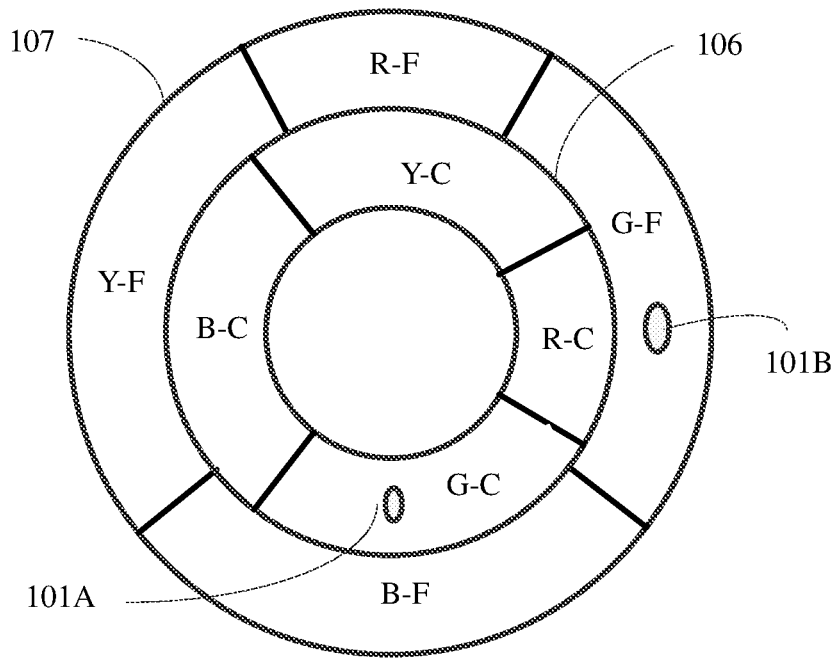

In the configuration shown in FIG. 6, the wavelength conversion region and the filter region of the same color are disposed at 90 degrees from each other with respect to the center of the rings of the wavelength conversion device 106 and filter device 107. In this case, the first optical assembly of FIG. 3 is rotated as a whole by 90 degrees around the optical axis of the excitation light which is emitted from the excitation light source to the wavelength conversion device.

Figure 7:
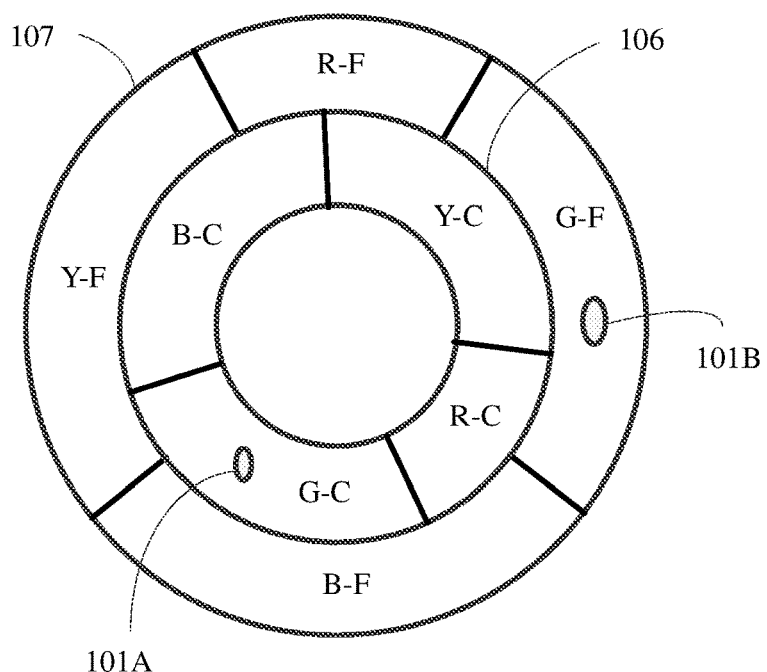

In the configuration shown in FIG. 7, the wavelength conversion region and the filter region of the same color are disposed at 120 degrees from each other with respect to the center of the rings of the wavelength conversion device 106 and filter device 107. In this case, the first optical assembly of FIG. 3 is rotated as a whole by 120 degrees around the optical axis of the excitation light which is emitted from the excitation light source to the wavelength conversion device.

Figure 8:
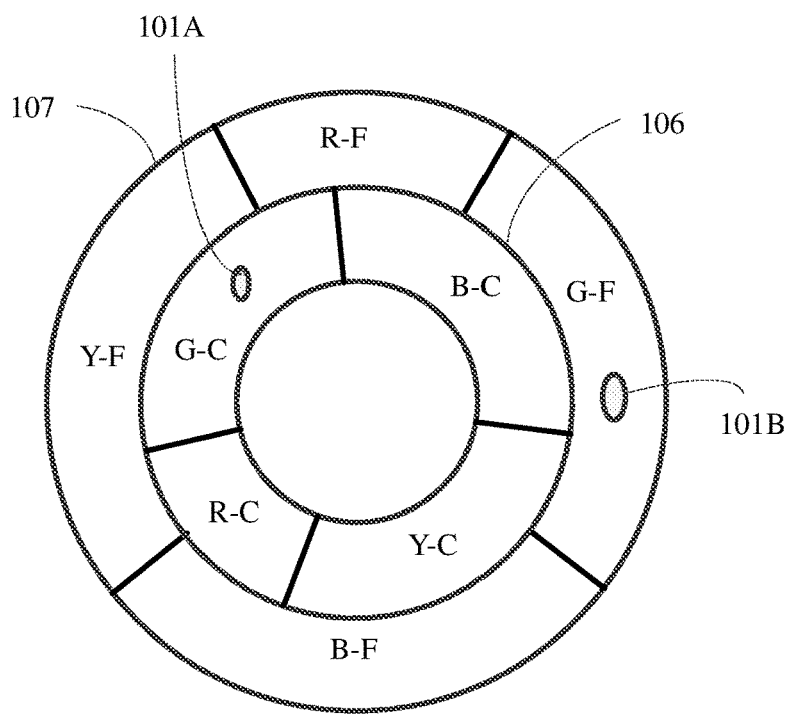

In the configuration shown in FIG. 8, the wavelength conversion region and the filter region of the same color are disposed at 225 degrees from each other with respect to the center of the rings of the wavelength conversion device 106 and filter device 107. In this case, the first optical assembly of FIG. 3 is rotated as a whole by 225 degrees around the optical axis of the excitation light which is emitted from the excitation light source to the wavelength conversion device.

Figure 9:
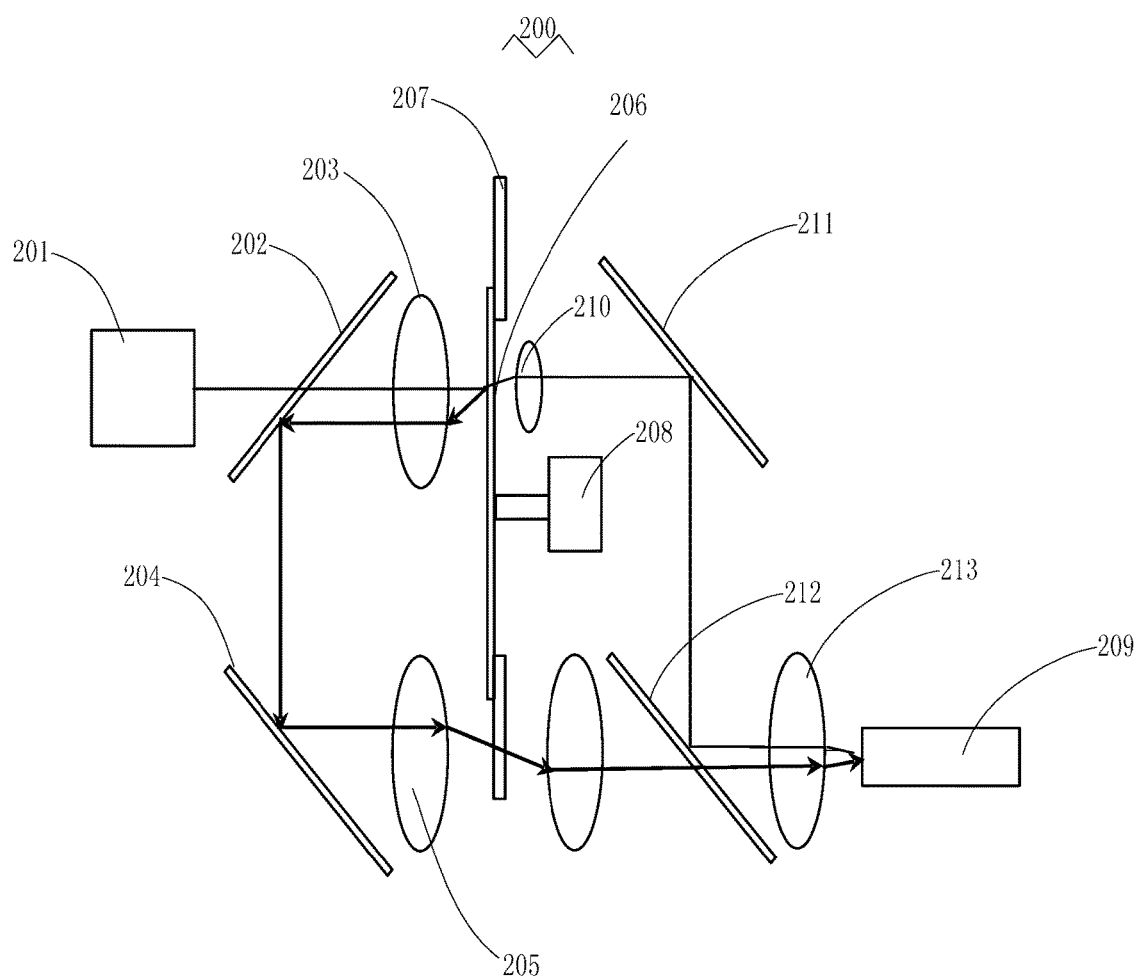
FIG. 9 shows the structure of a light source system according to a second embodiment of the present invention.
Figure 10:
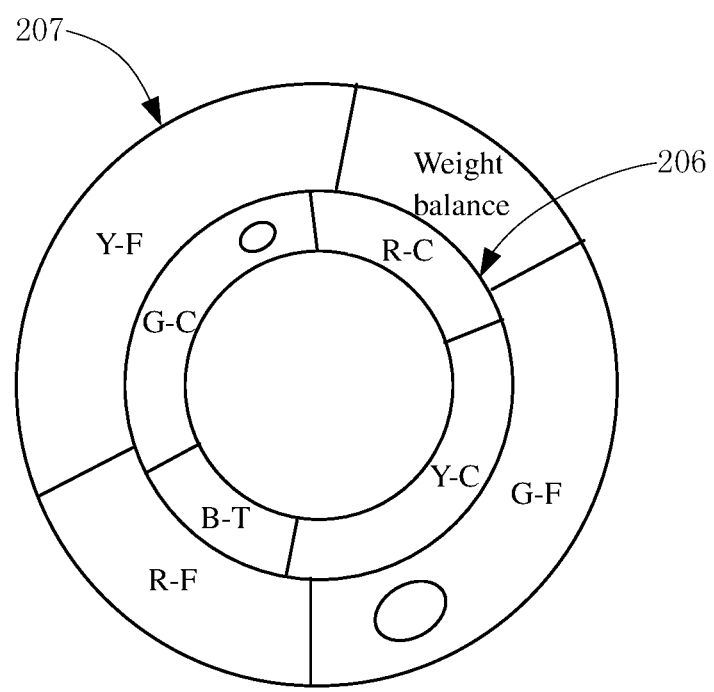
FIG. 10 is a plan view of the wavelength conversion device and the filter device of the light source system of FIG. 9.

Refer to FIGS. 9 and 10, where FIG. 9 shows the structure of a light source system according to a second embodiment of the present invention, and FIG. 10 is a plan view of the wavelength conversion device and the filter device of the light source system of FIG. 9. In the illustrated example, the wavelength conversion regions on the wavelength conversion device 206 and the filter regions of the same color on the filter device 207 are disposed at 180 degrees from each other with respect to the center of the rings of the wavelength conversion device 206 and filter device 207. But it should be understood that the wavelength conversion region on the wavelength conversion device 206 and the filter region of the same color on the filter device 207 may be disposed at any angle between 0 and 180 degrees from each other with respect to the center of the rings of the wavelength conversion device 206 and filter device 207. Differences between the light source system 200 of this embodiment and the light source system 100 shown in FIGS. 1 and 2 includes: In this embodiment, the excitation light source 201 is a blue laser or blue LED which generates a blue excitation light. As shown in FIG. 10, in this embodiment, the wavelength conversion device 206 includes a red wavelength conversion region, a yellow wavelength conversion region and a green wavelength conversion region, as well as a blue light transmission region. The filter device 207 includes a red filter region, a yellow filter region, and a green filter region. In this embodiment, the region of the filter device 207 that corresponds to the blue light transmission region of the wavelength conversion device 206 is not required to have any particular optical properties. However, to maintain rotational balance, this region may be a weight balance region which has a similar weight as the other filter regions. In this embodiment, the wavelength conversion device 206 and the filter device 207 are driven by the drive device 208 to rotate synchronously, so that the wavelength conversion regions and the blue light transmission region of the wavelength conversion device 206 are sequentially and periodically disposed on the propagation path of the blue excitation light generated by the excitation light source 201. Each wavelength conversion region converts the blue excitation light incident on it into a converted light of the corresponding color and reflects it, while the blue light transmission region transmits the blue excitation light incident on it. A suitable scattering mechanism may be provided on the blue light transmission region to destroy the parallel nature of the blue excitation light. The converted light that has been reflected by the wavelength conversion device 206 is guided by the first optical assembly formed by the lenses 203 and 205, the dichroic mirror 202, and the reflector 204, to be incident on the corresponding filter regions of the filter device 207. The filter regions filter the light to improve its color purity. The blue excitation light that has been transmitted through the wavelength conversion device 206 is guided by the second optical assembly formed by the lenses 210 and 213, the reflector 211, and the dichroic mirror 212, to be combined with the converted light that has been filtered by the filter device 207 into one beam. The combined light is inputted to the light homogenizing device 209 to be homogenized.

In the second optical assembly, the lenses 210 and 213 are respectively used to collect and focus the blue excitation light that has been transmitted by the wavelength conversion device 206, and the reflectors 211 and the dichroic mirror 212 are used to reflect the blue excitation light that has been transmitted by the wavelength conversion device 206 to change its propagation path. In this embodiment, the reflector 211 and the dichroic mirror 212 are disposed in parallel to each other, and are each disposed at a 45-degree angle with respect to the incident direction of the blue excitation light, so that the propagation direction of the blue excitation light is linearly translated by a predetermined distance and its direction is unchanged.

In this embodiment, using a transmission method, the blue excitation light generated by the excitation light source 201 is directly output as the blue light. In this embodiment, the reflector 211 and the dichroic mirror 212 may be replaced by other types of planar reflective devices, and the lenses 210 and 213 may be replaced by other types of optical components. Moreover, the structure may also be used in light source systems that use excitation light sources of other colors.

Figure 11:
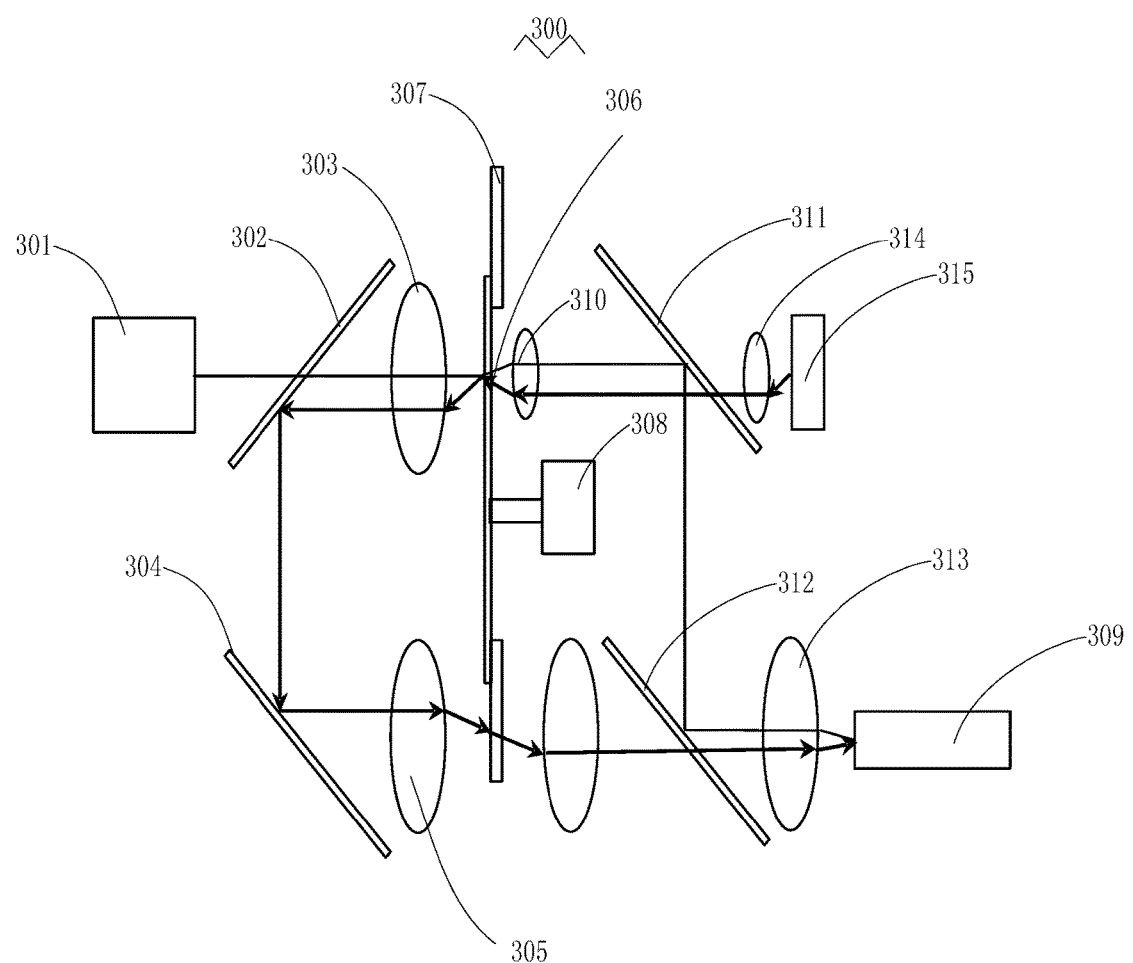
FIG. 11 shows the structure of a light source system according to a third embodiment of the present invention.
Figure 12:
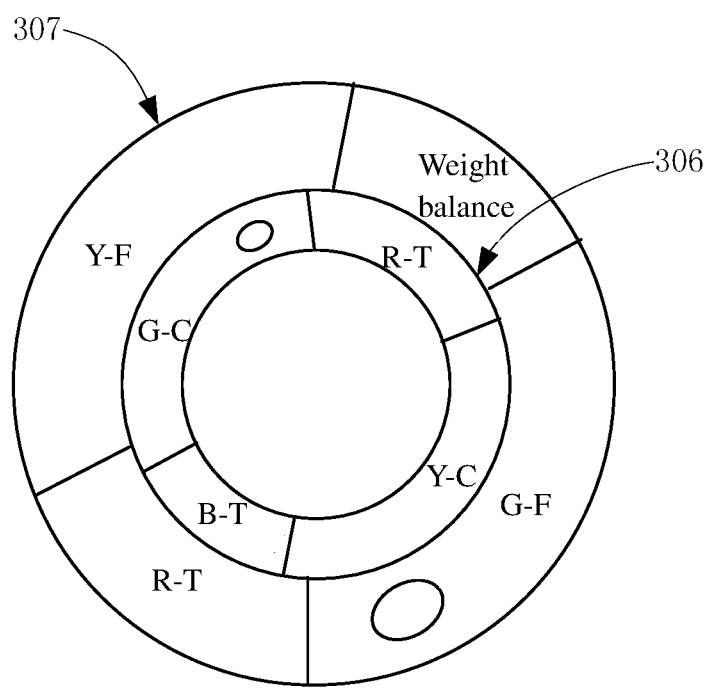
FIG. 12 is a plan view of the wavelength conversion device and the filter device of the light source system of FIG. 11.

Refer to FIGS. 11 and 12, where FIG. 11 shows the structure of a light source system according to a third embodiment of the present invention, and FIG. 12 is a plan view of the wavelength conversion device and the filter device of the light source system of FIG. 11. In the illustrated example, the wavelength conversion region on the wavelength conversion device 306 and the filter region of the same color on the filter device 307 are disposed at 180 degrees from each other with respect to the center of the rings of the wavelength conversion device 306 and filter device 307. It should be understood that the wavelength conversion region on the wavelength conversion device 306 and the filter region of the same color on the filter device 307 can be disposed at any angle between 0 and 180 degrees from each other with respect to the center of the rings of the wavelength conversion device 306 and filter device 307. Differences between the light source system 300 of this embodiment and the light source system 200 of FIGS. 9 and 10 include: in addition to the excitation light source 301, the light source system 300 includes a red illumination light source 315 (e.g. a red laser or red LED) to generate a red illumination light. The red illumination light source 315 and the excitation light source 301 are respectively disposed on two opposing sides of the wavelength conversion device 306 and the filter device 307. The red illumination light generated by the red illumination light source 315 passed through lens 314, dichroic mirror 311, and lens 310 to be incident onto the wavelength conversion device 306, and its incident direction is the opposite of the incident direction of the excitation light generated by the excitation light source 301.

In this embodiment, the wavelength conversion device 306 includes a red light transmission region, a yellow wavelength conversion region, a green wavelength conversion region, and a blue light transmission region. The filter device 307 includes a red light transmission region, a yellow filter region, a green filter region, and a weight balance region. In this embodiment, the wavelength conversion device 306 and the filter device 307 are driven by the drive device 308 to rotate synchronously, so that the multiple wavelength conversion regions, the red ling transmission region, and the blue light transmission region on the wavelength conversion device 306 are sequentially and periodically disposed on the propagation path of the blue excitation light generated by the excitation light source 301 as well as the red illumination light generated by the red illumination light source 315. Each wavelength conversion region converts the blue excitation light incident on it into a converted light of a corresponding color, and reflects the converted light. The blue light transmission region transmits the blue excitation light incident on it, and the red light transmission region transmits the red illumination light incident on it. A suitable scattering mechanism may be provided on the blue light transmission region and the red light transmission region to destroy the parallel nature of the blue excitation light and the red illumination light. The converted light that has been reflected by the wavelength conversion device 306 is guided by the first optical assembly formed by the lenses 303 and 305, the dichroic mirror 302, and the reflector 304, to be incident on the filter region of the corresponding color on the filter device 307. The filter region filters the light to improve its color purity. The red illumination light that has transmitted through the wavelength conversion device 306 is guided by the first optical assembly formed by the lenses 303 and 305, the dichroic mirror 302, and the reflector 304, and follows the same propagation path as the converted light, to be incident on the red light transmission region on the filter device 307 and transmitted by that region. The blue illumination light that has transmitted through the wavelength conversion device 306 is guided by the second optical assembly formed by the lenses 310 and 313 and the dichroic mirrors 311 and 312, to be combined with the converted light that has been filtered by the filter device 307 and the red illumination light that has transmitted through the filter device 307 into one beam. The combined light is inputted into the light homogenizing device 309 to be homogenized.

In a preferred embodiment, to ensure that the light homogenizing device 309 receives light of only one color at any given time, the rotation position of the wavelength conversion device 306 is detected to generate a synchronization signal. The excitation light source 301 and the red illumination light source 315 are turned on at different times in a time division manner based on the synchronization signal. More specifically, the red illumination light source 315 is turned on only when the red light transmission region is disposed on the propagation path of the red illumination light generated by the red illumination light source 315, and is turned off when the yellow wavelength conversion region, the green wavelength conversion region, and the blue light transmission region are disposed on the propagation path of the red illumination light. The excitation light source 301 is turned on only when the yellow wavelength conversion region, the green wavelength conversion region, and the blue light transmission region are disposed on the propagation path of the blue excitation light generated by the excitation light source 301, and is turned off when the red light transmission region is disposed on the propagation path of the blue excitation light. In another preferred embodiment, a light splitting filter that transmits the red illumination light and reflects the blue excitation light may be provided in the red light transmission region; a reflector that reflects the red illumination light may be provided on the yellow wavelength conversion region and the green wavelength conversion region on the side closer to the red illumination light source 315; and a light splitting filter that transmits the blue excitation light and reflects the red illumination light may be provided in the blue light transmission region.

In this embodiment, the red output light of the light source system 300 is directly provided by the red illumination light source 315, which avoids the problem of low conversion efficiency of red wavelength conversion materials. Of course, if color purity needs to be further improved, the red light transmission region may be replaced with a red filter region. In this embodiment, those skilled in the art may use other illumination light sources to generate illumination lights of other colors.

Figure 13:
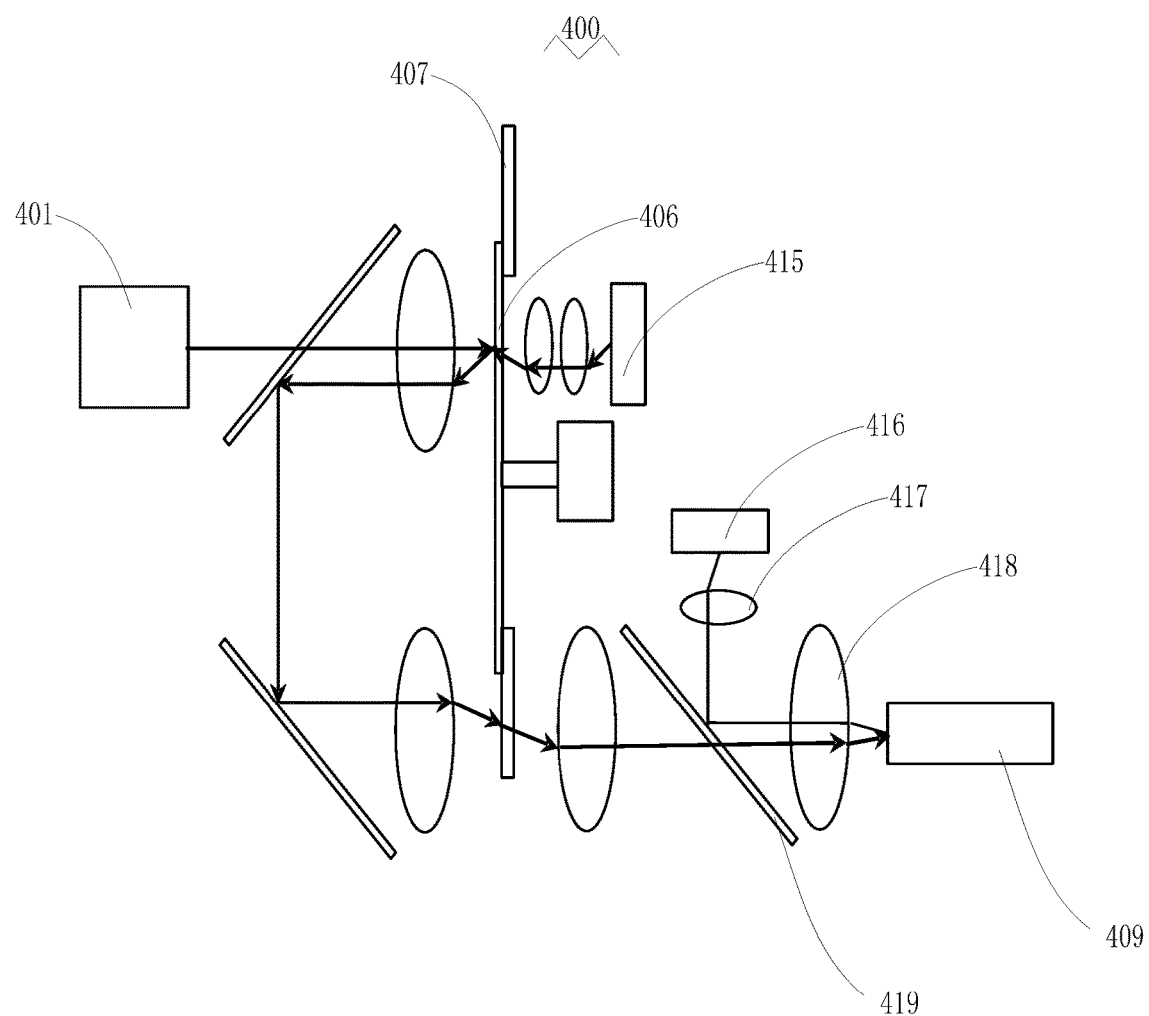
FIG. 13 shows the structure of a light source system according to a fourth embodiment of the present invention.

Refer to FIG. 13, which shows the structure of a light source system according to a fourth embodiment of the present invention. Differences between the light source system 400 of this embodiment and the light source system 300 shown in FIG. 11 include: the excitation light source 401 of this embodiment uses a UV or blue excitation light source. The wavelength conversion device of this embodiment 406 includes a yellow wavelength conversion region, a green wavelength conversion region, and a red light transmission region. Thus, the excitation light source 401 is only used to excite the yellow wavelength conversion region and the green wavelength conversion region to generate the yellow converted light and the green converted light. In addition to the excitation light source 401 and the red illumination light source 415, the light source system 400 of this embodiment further includes a blue illumination light source 416. The blue illumination light generated by the blue illumination light source 416 is guided by the second optical assembly formed by the lenses 417 and 418 and the dichroic mirror 419, to be combined with the converted light that has been filtered by the filter device 407 and the red illumination that that has been transmitted or filtered by the filter device 407 into one beam. The combined light is inputted into the light homogenizing device 409 to be homogenized. In this embodiment, the excitation light source 401, the red illumination light source 415, and the blue illumination light source 416 can be controlled to turn on and off in a time division manner similar to the third embodiment.

In this embodiment, the red light outputted by the light source system 400 is directly provided by the red illumination light source 415, and the blue light outputted by the light source system 400 is directly provided by the blue illumination light source 416, which avoids the problem of low conversion efficiency of wavelength conversion materials. Further, this structure is more suitable in the display field.

Figure 14:
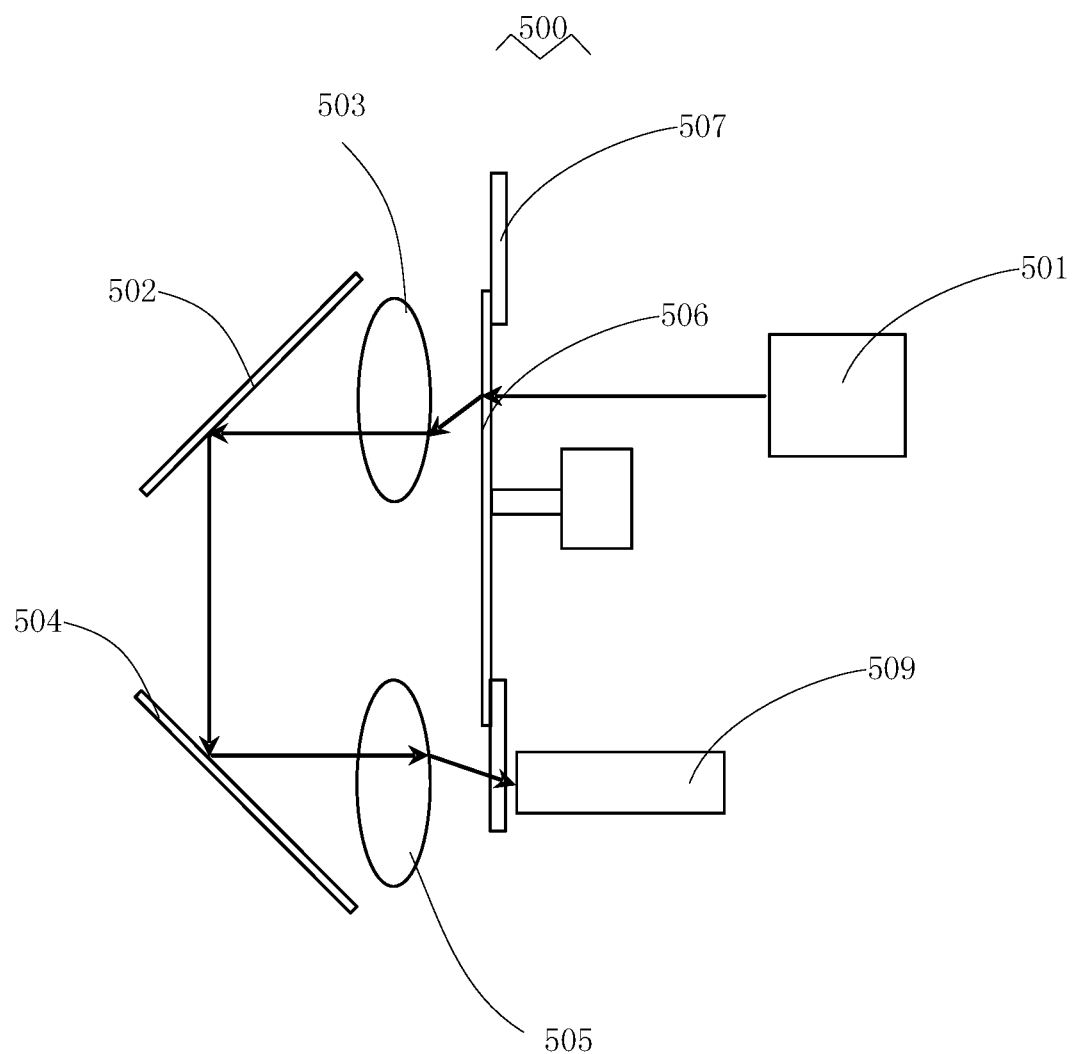
FIG. 14 shows the structure of a light source system according to a fifth embodiment of the present invention.

Refer to FIG. 14, which shows the structure of a light source system according to a fifth embodiment of the present invention. Differences between the light source system 500 of this embodiment and the light source system 100 shown in FIGS. 1 and 2 include: the wavelength conversion device 506, having wavelength-converted the excitation light generated by the excitation light source 101 into converted lights, transmits the converted light. The converted light that has been transmitted through the wavelength conversion device 506 is guided by the first optical assembly formed by the lenses 503 and 505 and the reflectors 502 and 504, to be incident on the filter regions of the same color on the filter device 507 to be filtered. The filtered light is inputted into the light homogenizing device 509.

Further, the excitation light source 501 may alternatively be a blue light source, and the wavelength conversion device 506 may further includes a light transmission region, which is periodically disposed on the propagation path of the excitation light generated by the excitation light source 501, and which transmits the excitation light. The excitation light that has transmitted through the light transmission region is guided by the first optical assembly formed by the lenses 503 and 505 and the reflectors 502 and 504, and follows the same propagation path as the converted light, to be incident on the other light transmission region or the filter region on the filter device 507, and transmitted or filtered by that region.

Figure 15:
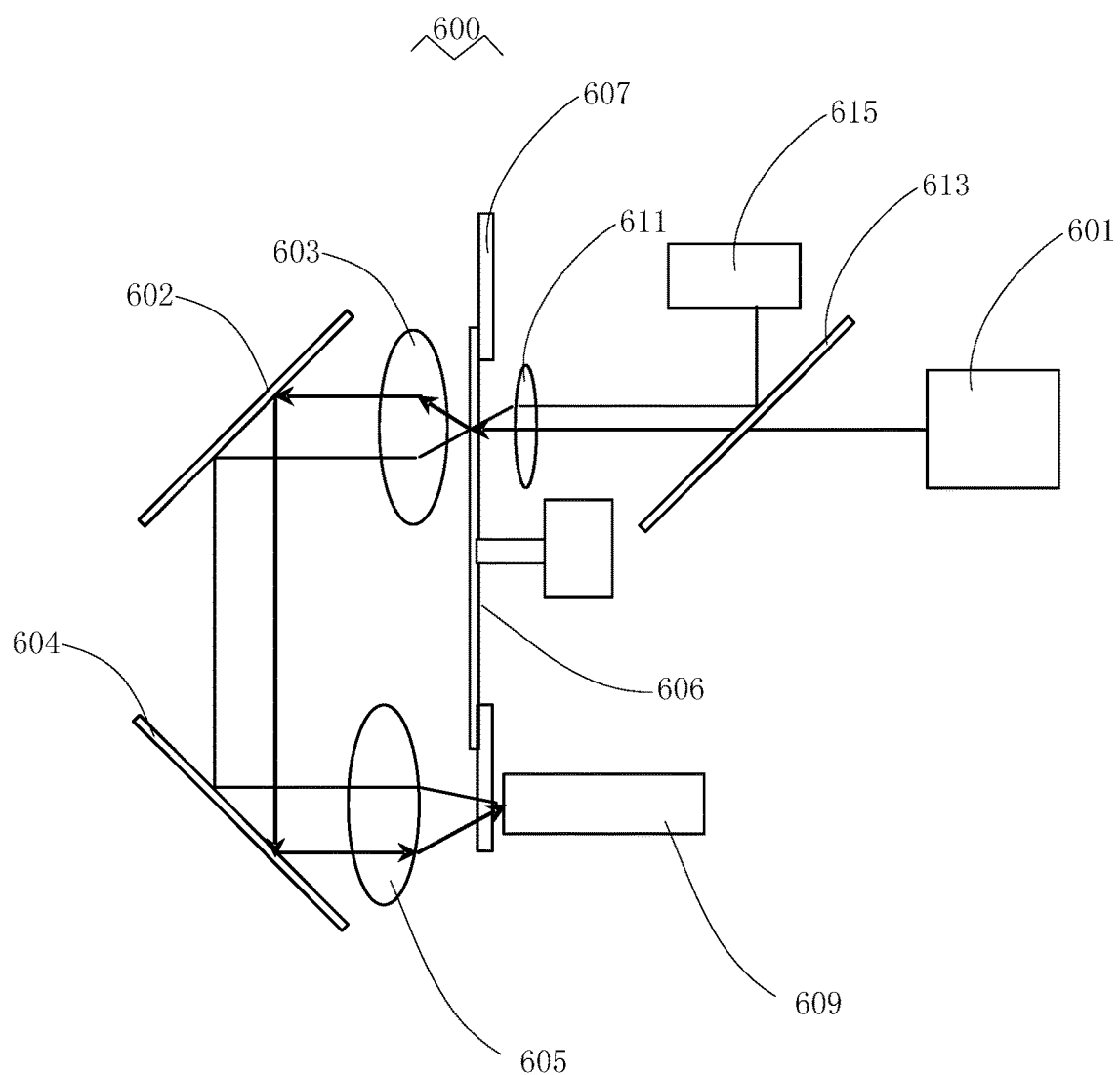
FIG. 15 shows the structure of a light source system according to a sixth embodiment of the present invention.

Refer to FIG. 15, which shows the structure of a light source system according to a sixth embodiment of the present invention. Differences between the light source system 600 of this embodiment and the light source system 500 shown in FIG. 14 include: in this embodiment, in addition to the excitation light source 601, the light source system 600 includes a red illumination light source 615 for generating a red illumination light. The red illumination light source 615 and the excitation light source 601 are disposed on the same side of the wavelength conversion device 606 and the filter device 607. The red illumination light generated by the red illumination light source 615 is reflected by the dichroic mirror 613 and focused by the lens 611, and is incident on the wavelength conversion device 606 from the same direction as the excitation light generated by the excitation light source 601. The excitation light generated by the excitation light source 601 is wavelength-converted by the wavelength conversion regions of the wavelength conversion device 606 into converted lights, which are transmitted by the wavelength conversion device 606. The red illumination light generated by the red illumination light source 615 is directly transmitted through the red light transmission region of the wavelength conversion device 606. The converted light that has transmitted through the wavelength conversion device 606 and the red illumination light are guided by the first optical assembly formed by the reflectors 602 and 604 and the lenses 603 and 605 along the same path to be respectively incident on the filter regions and the red light transmission region of the filter device 607. The converted light that has been filtered by the filter regions and the red illumination light that has transmitted through the red light transmission region are inputted into the light homogenizing device 609. Further, the above described red light transmission region may be replaced by a red filter region. In addition, in this embodiment, the excitation light source 601 and the red illumination light source 615 can be controlled to turn on and off in a time division manner similar to the third embodiment.

Figure 16:
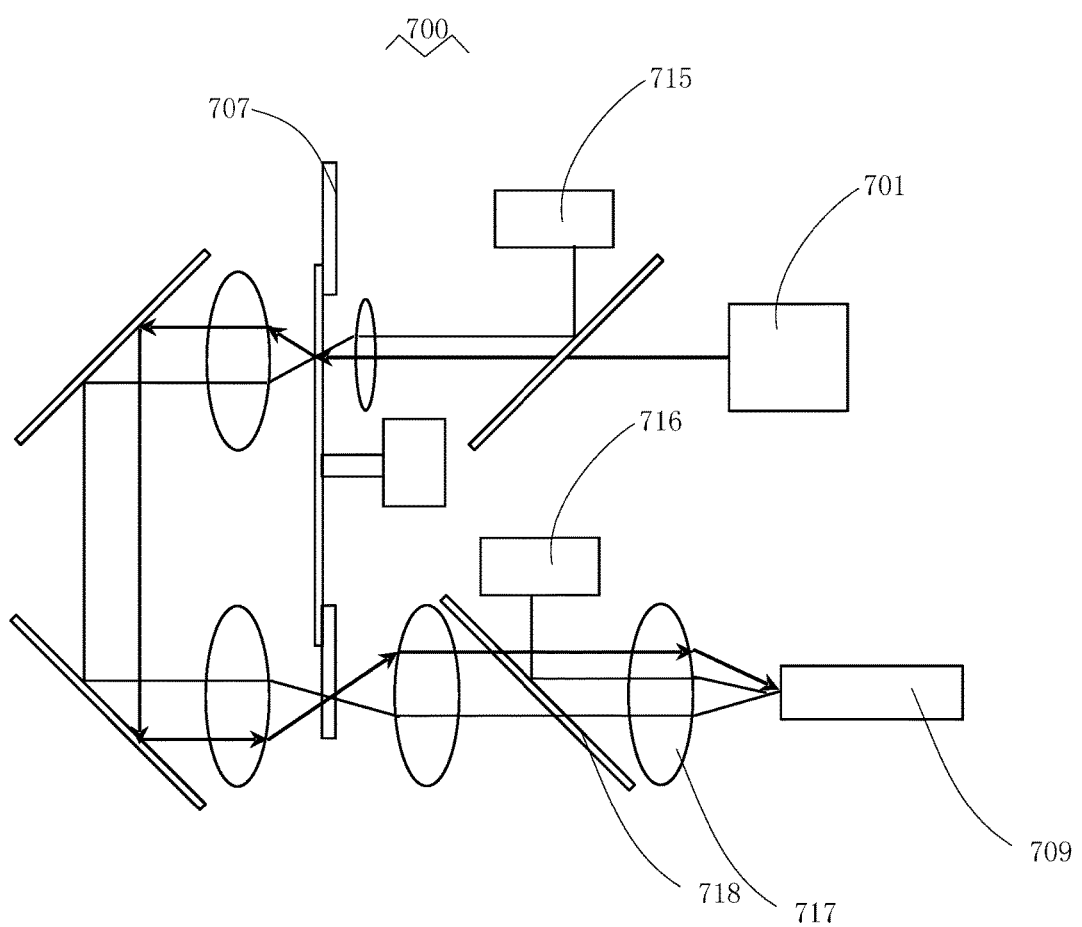
FIG. 16 shows the structure of a light source system according to a seventh embodiment of the present invention.

Refer to FIG. 16, which shows the structure of a light source system according to a seventh embodiment of the present invention. Differences between the light source system 700 of this embodiment and the light source system 600 shown in FIG. 15 include: in this embodiment, in addition to the excitation light source 701 and the red illumination light source 715, the light source system 700 further includes a blue illumination light source 716. The blue illumination light generated by the blue illumination light source 716 is combined, by the second optical assembly formed by the lens 717 and the dichroic mirror 718, with the converted light that has been filtered by the filter device 707 and the red illumination light that has been filtered or transmitted by the filter device 707 into one beam. The combined light is inputted in the light homogenizing device 709 to be homogenized. In this embodiment, the excitation light source 701, the red illumination light source 715 and the blue illumination source 716 can be controlled to turn on and off in a time division manner similar to the third embodiment.

Figure 17:
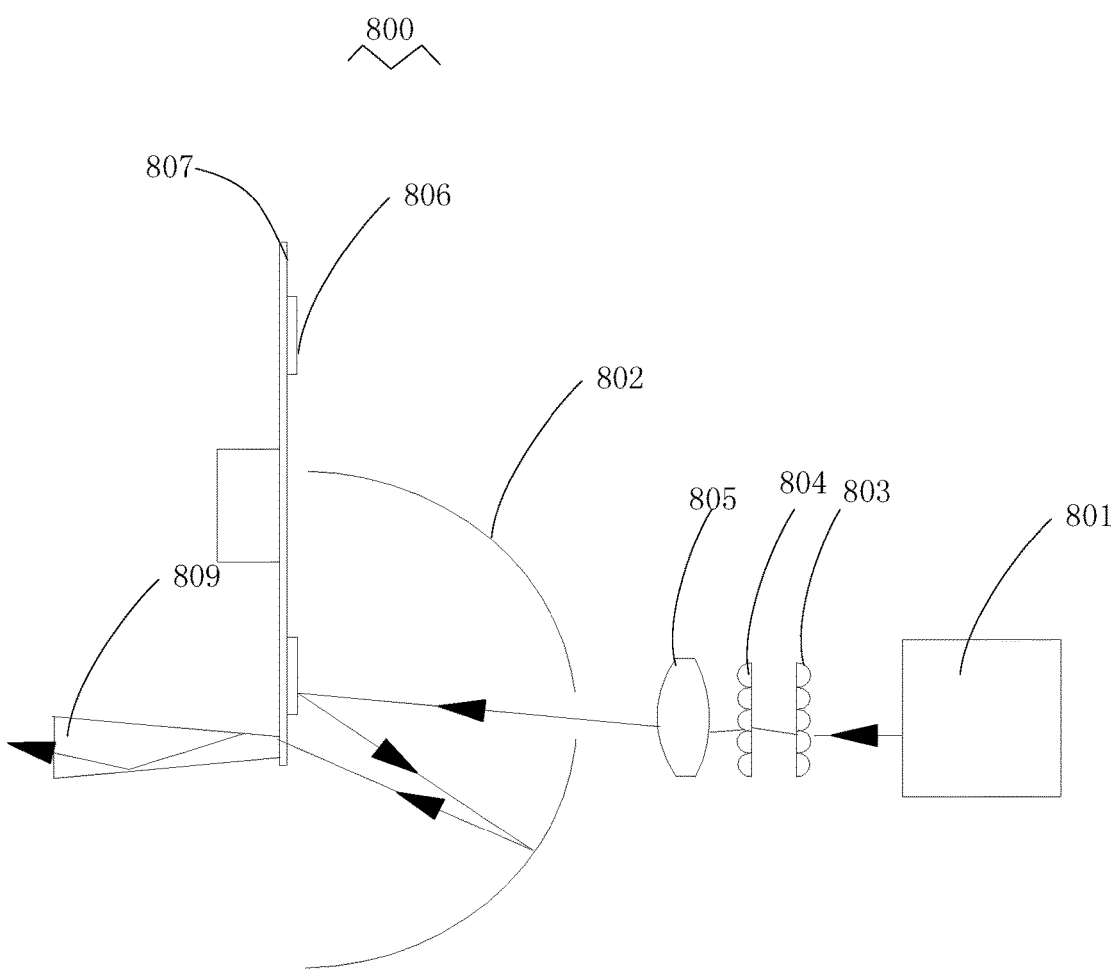
FIG. 17 shows the structure of a light source system according to an eighth embodiment of the present invention.

Refer to FIG. 17, which shows the structure of a light source system according to an eighth embodiment of the present invention. Differences between the light source system 800 of this embodiment and the light source system 100 shown in FIGS. 1 and 2 include: In this embodiment, the excitation light generated by the excitation light source 801 is condensed by the fly-eye lenses 803 and 804 and the focusing lens 805, and is then incident on the wavelength conversion device 806 through a light entrance aperture of the reflecting device 802. The converted light reflected by the wavelength conversion device 806 is reflected to the filter device 807 by the reflecting device 802, where the reflecting device 802 has a hemi-ellipsoidal or hemispherical shape and has an inward facing reflecting surface. The converted light filtered by the filter device 807 then enters the cone shaped light rod 809. When the reflecting device 802 is a hemi-ellipsoidal shape, the reflecting device 802 can reflect the converted light which is located near one focal point of the reflecting device 802 to a point located near another focal point of the reflecting device 802. When the reflecting device 802 is a hemispherical shape, for two points that are near the hemispherical center and are symmetrical with respect to the hemispherical center, the reflecting device 802 can reflect the converted light located at one of the symmetrical points to the other one of the symmetrical points. Further, in alternative embodiments, the reflecting device 802 does not have a light entrance aperture. In such a case, the excitation light source 801 and the reflecting device 802 are respectively located on the two opposing sides of the wavelength conversion device 806. The excitation light generated by the excitation light source 801 illuminates the wavelength conversion device 806, which generates the converted light and transmits the converted light to the reflecting device 802.

It should be noted that, as reflected by the reflecting device 802, the light spot on the wavelength conversion device 806, which is generated by the excitation light from the excitation light source 801, and the light spot on the filter device 807, which is generated by the converted light, are disposed at 0 degree from each other with respect to the center of the rings of the wavelength conversion device 806 and filter device 807. Therefore, the wavelength conversion region of the wavelength conversion device 806 and the corresponding filter region of the same color on the filter device 807 also need to be disposed at 0 degree from each other with respect to the center of the rings of the wavelength conversion device 806 and filter device 807.

Of course, in alternative embodiments, by using suitable optical components, the light spot generated by the excitation light on the wavelength conversion device 806 and the light spot generated by the converted light on the filter device 807 can be adjusted to be at any angle from each other with respect to the center of the rings of the wavelength conversion device 806 and filter device 807. Thus, the wavelength conversion region of the wavelength conversion device 806 and the corresponding filter region of the same color on the filter device 807 can also be at any angle from each other with respect to the center of the rings of the wavelength conversion device 806 and filter device 807.

Figure 18:
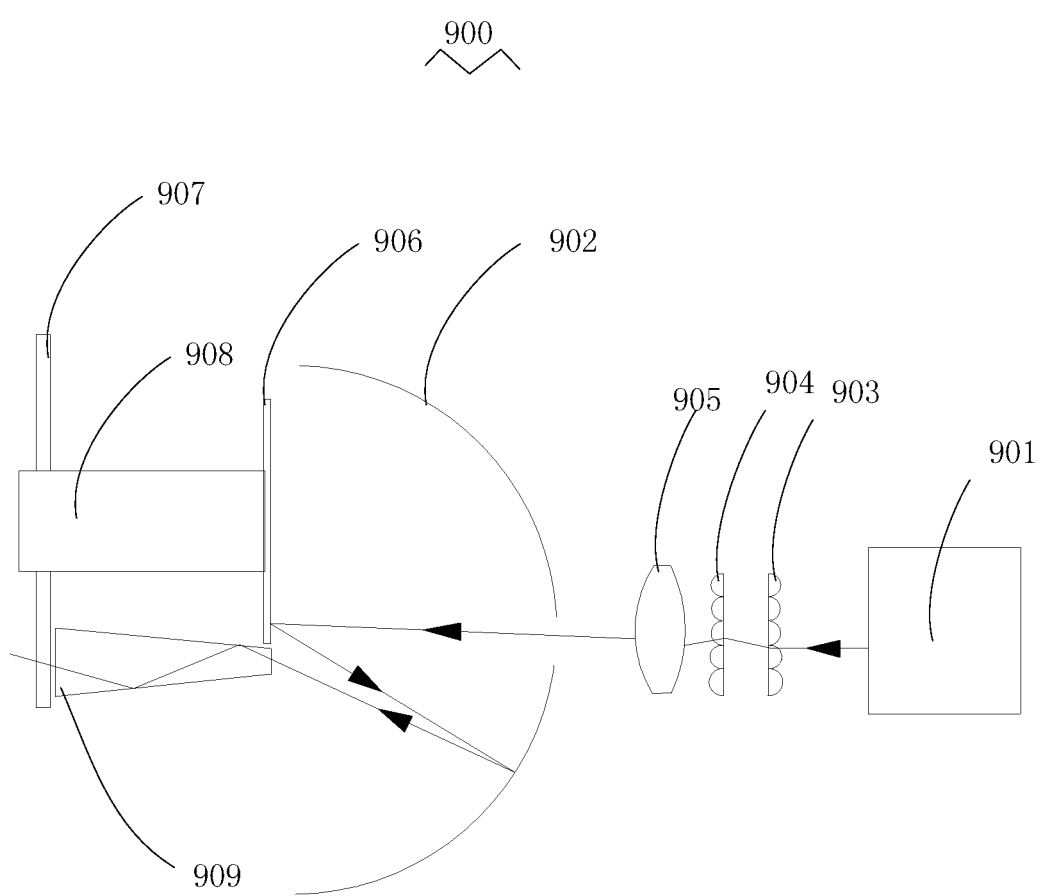
FIG. 18 shows the structure of a light source system according to a ninth embodiment of the present invention.

Refer to FIG. 18, which shows the structure of a light source system according to a ninth embodiment of the present invention. Differences between the light source system 900 of this embodiment and the light source system 800 shown in FIG. 17 include: The wavelength conversion device 906 and the filter device 907 are fixed coaxially by a support frame 908, and are spaced apart from each other in the axial direction. A cone shaped light rod 909 is disposed between the wavelength conversion device 906 and the filter device 907. The excitation light generated by the excitation light source 901 is condensed by the fly-eye lenses 903 and 904 and the focusing lens 905, and is incident on the wavelength conversion device 906 through a light entrance aperture of the reflecting device 902. The converted light reflected by the wavelength conversion device 906 is incident on the reflecting device 902 and is reflected by it. The converted light reflected by the reflecting device 902 first enters the light rod 909. The light rod 909 collects the converted light to reduce its divergent angle. The converted light, after being guided by the light rod 909, is incident on the filter device 907, so that the incident angles of the converted light on the filter device 907 are relatively small, which improves filtering effect. In this embodiment, the light rod 909 can be replaced by other optical components that can perform the above-described function. Further, in this embodiment, if the wavelength conversion device 906 is a transmission type device, the reflecting device 902 can be omitted; in this case, the converted light is transmitted through the wavelength conversion device 906 and directly enters the light rod 909.

As described earlier, in the embodiments of FIGS. 17 and 18, in addition to the excitation light source 801 and 901, an illumination light source may be provided, such as a red illumination light source or a blue illumination light source.

Figure 19:
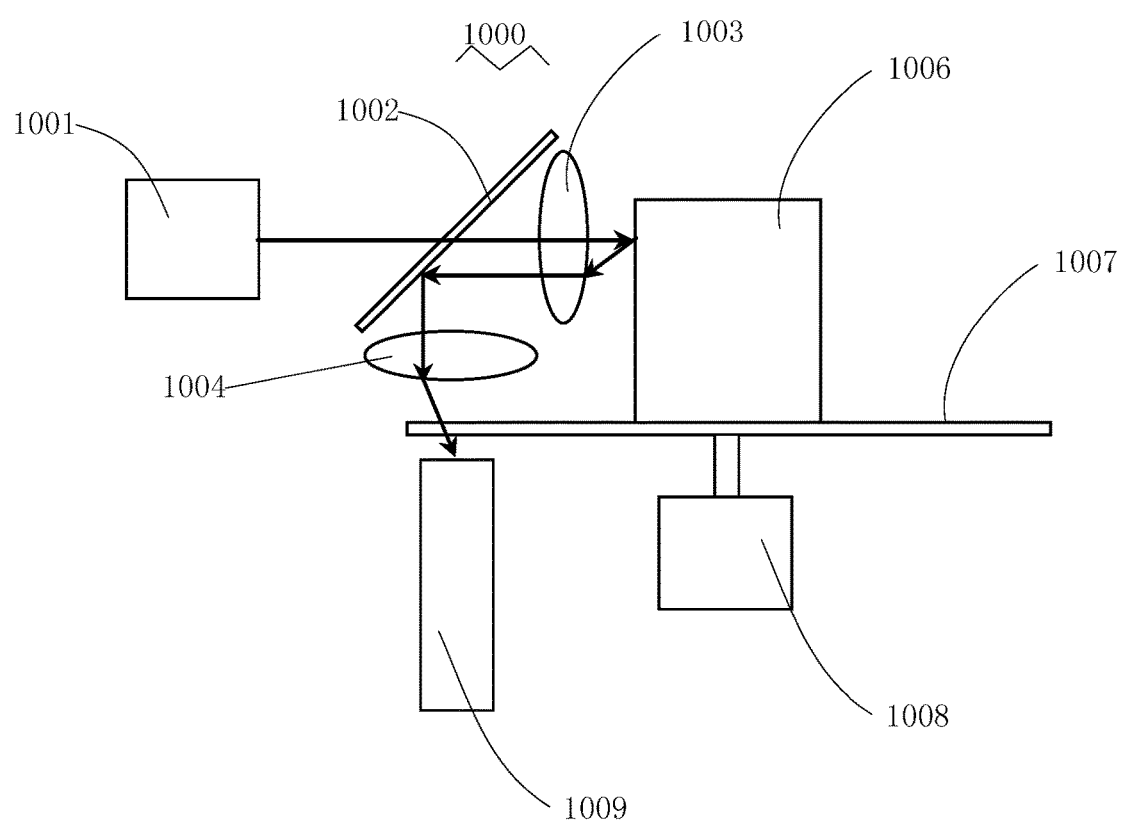
FIG. 19 shows the structure of a light source system according to a tenth embodiment of the present invention.

Refer to FIG. 19, which shows the structure of a light source system according to a tenth embodiment of the present invention. Differences between the light source system 1000 of this embodiment and the light source system 100 shown in FIGS. 1 and 2 includes: In this embodiment, the wavelength conversion device 1006 has a cylindrical shaped structure, and the wavelength conversion regions are located on the outer side surface of the cylindrical shaped structure. The filter device 1007 of this embodiment is a ring shaped structure and coaxially fixed to the cylindrical shaped structure. The wavelength conversion device 1006 and the filter device 1007 are further coaxially fixed to the rotational axis of the drive device 1008, and are driven by the drive device 1008 to rotate coaxially and synchronously.

In the operation of the light source system 1000 of this embodiment, the excitation light generated by the excitation light source 1001 is transmitted through the dichroic mirror 1002, and is focused by the lens 1003 onto the outer side surface of the wavelength conversion device 1006. The wavelength conversion regions on the outer side surface of the wavelength conversion device 1006 convert the excitation light into the converted light, and reflect the converted light. The converted light, after being reflected by the wavelength conversion device 1006, is guided by the first optical assembly formed by the lenses 1003 and 1004 and the dichroic mirror 1002 to be incident on the filter device 1007. The filter regions of the filter device 1007 are located to the outside of the cylindrical shaped structure of the wavelength conversion device 1006, to receive the converted light and filter it to improve its color purity. The converted light, after being filtered by the filter regions of the filter device 1007, is inputted to the light homogenizing device 1009 to be homogenized. In alternative embodiments, the wavelength conversion device 1006 may transmit the converted light which is then incident on the filter device 1007.

Figure 20:
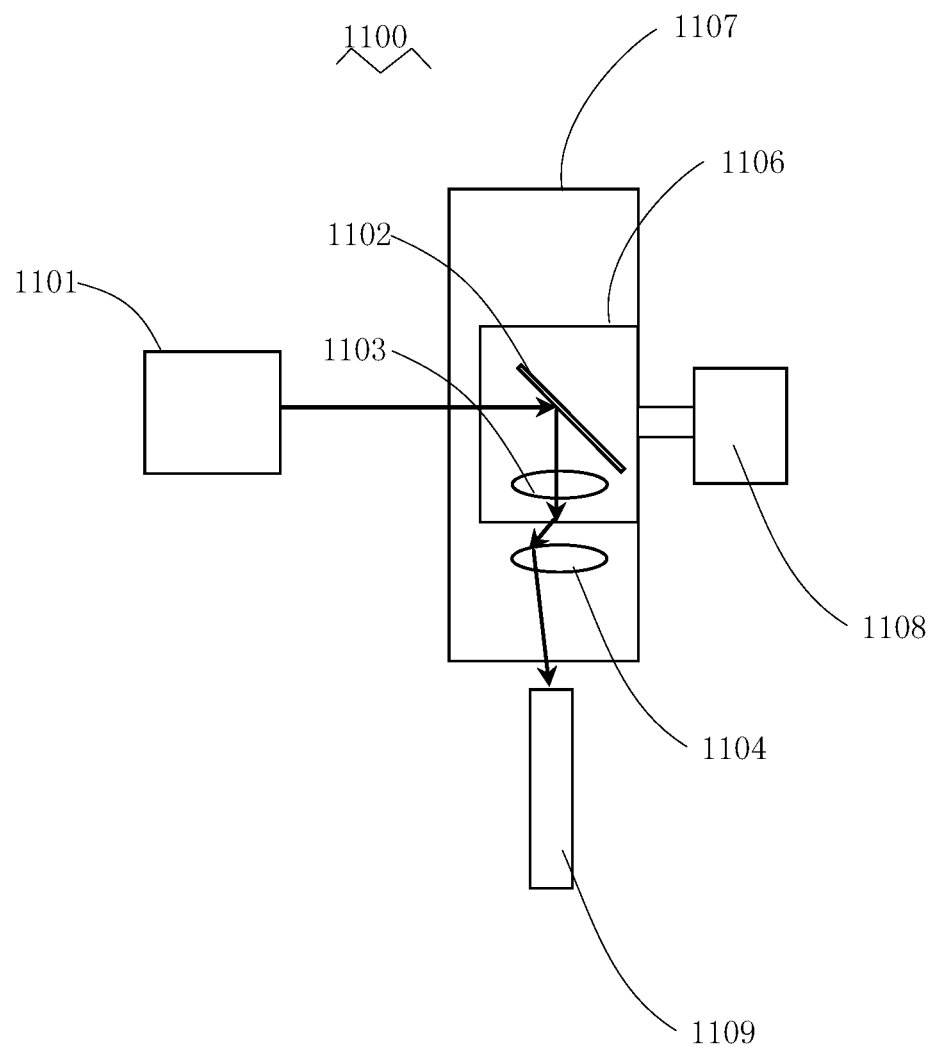
FIG. 20 shows the structure of a light source system according to an eleventh embodiment of the present invention.

Refer to FIG. 20, which shows the structure of a light source system according to an eleventh embodiment of the present invention. Differences between the light source system 1100 of this embodiment and the light source system 100 shown in FIGS. 1 and 2 includes: In this embodiment, the wavelength conversion device 1106 and the filter device 1107 are two coaxially fixed and nested cylindrical structures, and the wavelength conversion regions and the filter regions are respectively located on the side surfaces of the two cylindrical structures. The filter device 1107 is located on the outside of the wavelength conversion device 1106. The wavelength conversion device 1106 and the filter device 1107 are further coaxially fixed to the rotational axis of the drive device 1108, and are driven by the drive device 1108 to rotate coaxially and synchronously.

In the operation of the light source system 1100 of this embodiment, the excitation light generated by the excitation light source 1101 is reflected by the reflector 1102, and focused by the lens 1103 onto the wavelength conversion device 1106. The wavelength conversion regions of the wavelength conversion device 1106 convert the excitation light into the converted light, and transmit the converted light. The converted light, having transmitted through the wavelength conversion device 1106, is guided by the first optical assembly formed by the lens 1104 to be incident on the filter device 1107. The filter regions of the filter device 1107 filter the converted light to improve its color purity. The converted light, after being filtered by the filter regions of the filter device 1107, is inputted to the light homogenizing device 1109 to be homogenized.

Figure 21:
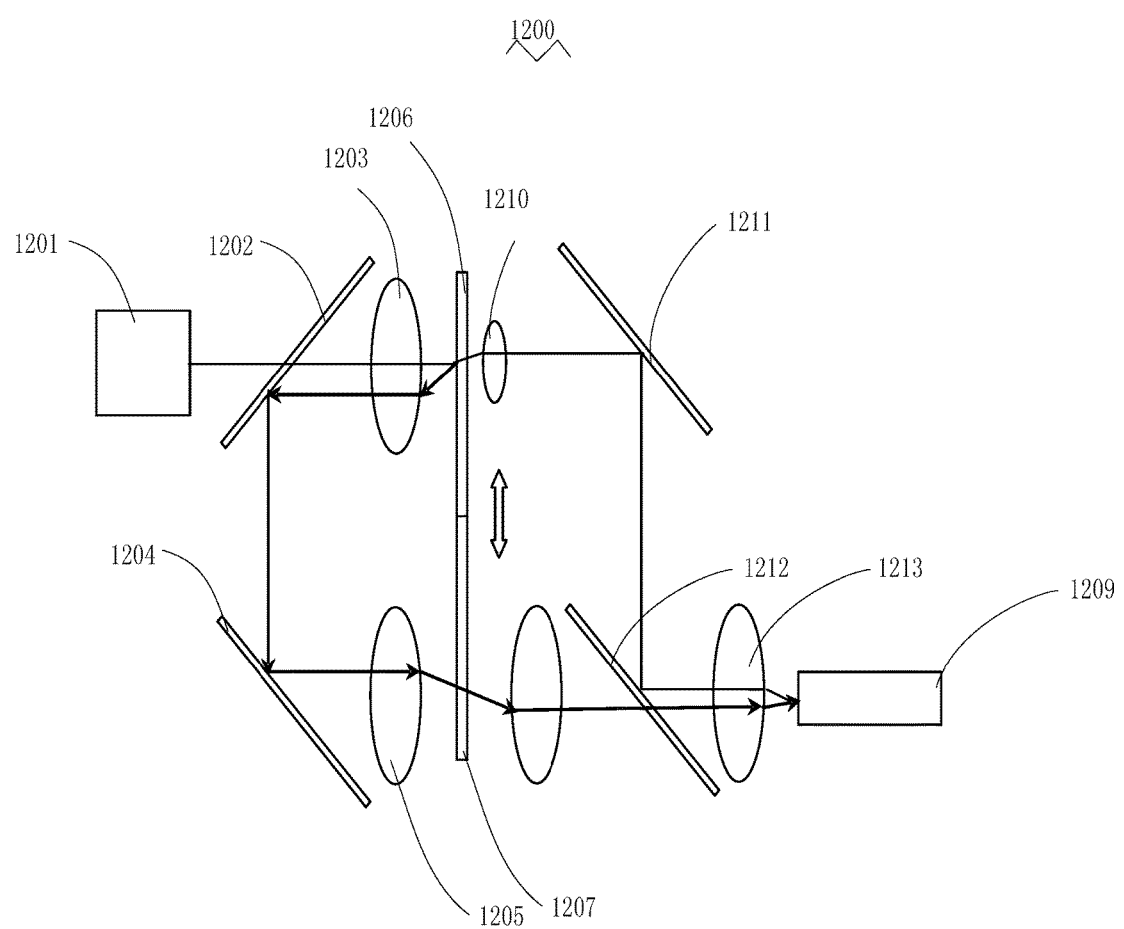
FIG. 21 shows the structure of a light source system according to a twelfth embodiment of the present invention.
Figure 22:
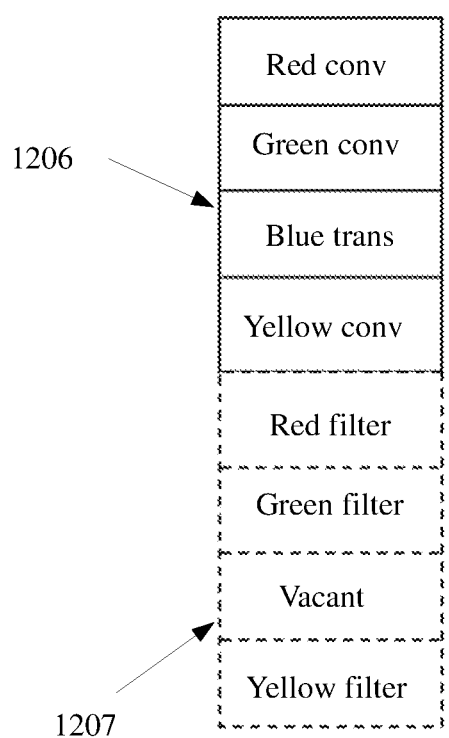
FIG. 22 is a plan view of the wavelength conversion device and the filter device of the light source system of FIG. 21.

Refer to FIGS. 21 and 22, where FIG. 21 shows the structure of a light source system according to a twelfth embodiment of the present invention, and FIG. 22 is a plan view of the wavelength conversion device and filter device of the light source system of FIG. 21. Differences between the light source system 1200 of this embodiment and the light source system 200 of FIGS. 9 and 10 include: In this embodiment, the wavelength conversion device 1206 and the filter device 1207 are two strip shaped structures connected together end to end, and the wavelength conversion regions and the filter regions are sequentially disposed adjacent to each other on the two strip shaped structures. In this embodiment, the wavelength conversion device 1206 includes adjacent and sequentially disposed red wavelength conversion region, green wavelength conversion region, blue light transmission region, and yellow wavelength conversion region; the filter device 1207 includes adjacent and sequentially disposed red filter region, green filter region, vacant region, and yellow filter region.

The wavelength conversion device 1206 and filter device 1207 are driven by a suitable drive device (such as a linear motor) to move in a back and forth linear translation motion, so that the red wavelength conversion region, the green wavelength conversion region, the blue wavelength conversion region, and the yellow wavelength conversion region are periodically disposed on the propagation path of the blue excitation light generated by the excitation light source 1201. Each of the multiple wavelength conversion regions converts the blue excitation light incident on it to a converted light of the corresponding color and reflects the converted light, and the blue light transmission region transmits the blue excitation light incident on it. A suitable scattering mechanism may be provided on the blue light transmission region to destroy the parallel nature of the blue excitation light. The converted light, after being reflected by the wavelength conversion device 1206, is guided by the first optical assembly formed by the lenses 1203 and 1205, the dichroic mirror 1202, and the reflector 1204 to be incident on the filter region of the corresponding color on the filter device 1207, which filters the converted light to improve its color purity. The blue excitation light which transmits through the wavelength conversion device 1206 is guided by the second optical assembly formed by the lenses 1210 and 1213, the reflector 1211, and the dichroic mirror 1212, to be combined with the converted light that has been filtered by the filter device 1207 into one beam. The combined light is inputted into the light homogenizing device 1209 to be homogenized. The structures of the wavelength conversion device 1206 and the filter device 1207 can similarly be used in the other embodiments described above, and detailed descriptions are omitted.

Other embodiments of the present invention further provide a light source assembly that employs the above described wavelength conversion devices and filter devices.

In summary, in light source system and light source system assembly according to embodiments of the present invention, the wavelength conversion device and the filter device are fixed with respect to each other, and are driven by the same drive mechanism. They have the advantages of simple structures, ease of implementation, and superior synchronization.

It will be apparent to those skilled in the art that various modification and variations can be made in the light source device and light source assembly and related method of the present invention without departing from the spirit or scope of the invention. Thus, it is intended that the present invention cover modifications and variations that come within the scope of the appended claims and their equivalents.

What is claimed is:

1. A light source system comprising:
an excitation light source for generating an excitation light;
a wavelength conversion device including at least one wavelength conversion region;
a filter device fixed relative to the wavelength conversion device and including at least one first filter region;
a drive device for driving the wavelength conversion device and the filter device, wherein the wavelength conversion region and the first filter region move synchronously, and wherein the wavelength conversion region is periodically disposed on a propagation path of the excitation light and wavelength-converts the excitation light into a converted light; and
a first optical assembly for guiding the converted light onto the first filter region, wherein the first filter region filters the converted light to increase its color purity;
wherein the wavelength conversion device and the filter device are two ring shaped structures that are coaxially fixed to each other; and
wherein the first optical assembly is disposed so that a light spot formed on the wavelength conversion device by the excitation light and a light spot formed on the filter device by the converted light are disposed at a predefined angle from each other with respect to a center of the two ring shaped structures, the predefined angle being an angle between a geometric line connecting the center with the light spot formed on the wavelength conversion device and a geometric line connecting the center with the light spot formed on the filter device, the predefined angle being greater than 0 degree and less than 180 degrees.

2. The light source system of claim 1, wherein the drive device is a rotation device having a rotational axis, and wherein the two ring shaped structures are coaxially fixed on the rotational axis.

3. The light source system of claim 1, wherein the wavelength conversion device and the filter device are spaced apart from each other in an axial direction, wherein the first optical assembly includes at least one light collecting device disposed on an optical path between the wavelength conversion device and the filter device to collect the converted light, wherein an energy of the converted light incident on the filter device with incident angles less than or equal to 60 degrees is more than 90% of a total energy of the converted light.

4. The light source system of claim 1, wherein the wavelength conversion region reflects the converted light, and wherein an exit direction of the converted light from the wavelength conversion region is opposite to an incident direction of the excitation light on the wavelength conversion region.

5. The light source system of claim 1, wherein the wavelength conversion region transmits the converted light, and wherein an exit direction of the converted light from the wavelength conversion region is the same as an incident direction of the excitation light on the wavelength conversion region.

6. The light source system of claim 1, wherein the first optical assembly includes at least one light collecting device for collecting the converted light, wherein an energy of the converted light incident on the filter device with incident angles less than or equal to 60 degrees is more than 90% of a total energy of the converted light.

7. The light source system of claim 1, wherein the first optical assembly includes at least one reflecting device for reflecting the converted light and changing a propagation direction of the converted light, wherein the reflecting device is a planar reflecting device or a hemi-ellipsoidal or hemispherical reflecting device having an inward facing reflecting surface.

8. The light source system of claim 7, wherein the hemi-ellipsoidal or hemispherical reflecting device having the inward facing reflecting surface includes a light entrance aperture, and wherein the excitation light is incident on the wavelength conversion device through the light entrance aperture.

9. The light source system of claim 1, wherein the wavelength conversion device includes a first light transmission region, wherein the first light transmission region is periodically disposed on the propagation path of the excitation light when driven by the drive device, and wherein the first light transmission region transmits the excitation light.

10. The light source system of claim 9, further comprising a second optical assembly, wherein the second optical assembly combines the excitation light that has transmitted through the first light transmission region and the converted light that has been filtered by the first filter region into one beam.

11. The light source system of claim 9, wherein the filter device further includes a second light transmission region or a second filter region, and wherein the first optical assembly guides the excitation light, which has transmitted through the first light transmission region, along a same propagation path as the converted light to the second light transmission region or the second filter region to be transmitted or filtered.

12. The light source system of claim 1, further comprising an illumination light source for generating an illumination light, wherein the wavelength conversion device further includes a first light transmission region, the first light transmission region being periodically disposed on a propagation path of the illumination light when driven by the drive device, wherein the first light transmission region transmitting the illumination light, wherein the filter device further includes a second light transmission region or a second filter region, and wherein the first optical assembly guides the illumination light, which has transmitted through the first light transmission region, along a same propagation path as the converted light to the second light transmission region or the second filter region to be transmitted or filtered.

13. The light source system of claim 1, further comprising an illumination light source and a second optical assembly, the illumination source generating an illumination light, wherein the second optical assembly combines the illumination light and the converted light that has been filtered by the first filter region into one beam.

14. The light source system of claim 1, wherein the wavelength conversion device has a cylindrical shaped structure, wherein the filter device has a ring shaped structure and is coaxially fixed with the cylindrical shaped structure, wherein the ring shaped structure and the cylindrical shaped structure are driven by the drive device to rotate coaxially and synchronously.

15. The light source system of claim 14, wherein the wavelength conversion region is located on an outer side surface of the cylindrical shaped structure and reflects the converted light, and wherein the first filter region is located to an outside of the cylindrical shaped structure to receive the converted light.

16. The light source system of claim 1, wherein the wavelength conversion device and the filter device are two coaxially fixed and nested cylindrical shaped structures which are driven by the drive device to rotate coaxially and synchronously, wherein the wavelength conversion region and the first filter region are respectively located on side surfaces of the two cylindrical shaped structures, and wherein the converted light transmits through the wavelength conversion region to be incident on the first filter region.

17. A projection system comprising the light source system of claim 1.

18. The light source system of claim 1, wherein the predefined angle is 45 degrees, or 90 degrees, or 120 degrees, or 225 degrees.

* * * * *